United States Patent
Tan et al.

(10) Patent No.: US 10,927,742 B2
(45) Date of Patent: Feb. 23, 2021

(54) SYSTEMS AND METHODS FOR CONTROLLING PISTON PUMPS

(71) Applicant: Cummins Emission Solutions Inc., Columbus, IN (US)

(72) Inventors: Kern Lik Tan, Greenwood, IN (US); Joe V. Hill, Columbus, IN (US); Deepu Chandy, Columbus, IN (US); Vikram Sundararajan, Columbus, IN (US); Vinayak Mandavkar, Columbus, IN (US); Hemant Sindkar, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 16/978,142

(22) PCT Filed: Mar. 7, 2019

(86) PCT No.: PCT/US2019/021192
§ 371 (c)(1),
(2) Date: Sep. 3, 2020

(87) PCT Pub. No.: WO2019/173617
PCT Pub. Date: Sep. 12, 2019

(65) Prior Publication Data
US 2021/0010404 A1   Jan. 14, 2021

Related U.S. Application Data

(60) Provisional application No. 62/640,375, filed on Mar. 8, 2018.

(51) Int. Cl.
*F01N 3/20* (2006.01)
*F01N 11/00* (2006.01)

(52) U.S. Cl.
CPC .............. *F01N 3/208* (2013.01); *F01N 11/00* (2013.01)

(58) Field of Classification Search
CPC .......... F01N 11/00; F01N 3/021; F01N 3/103; F01N 3/2066; F01N 3/2892; F01N 9/00;
(Continued)

(56) References Cited

U.S. PATENT DOCUMENTS 8,899,021 B2    12/2014   Dingle et al.
9,227,826 B2    1/2016    Beavis et al.
(Continued)

OTHER PUBLICATIONS

International Search Report and Written Opinion issued in PCT/US2019/021192, dated May 17, 2019, 15 pages.

*Primary Examiner* — Brandon D Lee
(74) *Attorney, Agent, or Firm* — Foley & Lardner LLP

(57) ABSTRACT

A controller configured to be operatively coupled to a reductant insertion assembly comprising a first pump for inserting a reductant into a selective catalytic reduction system, is programmed to set an insertion interval timer for the first insertion interval in response to receiving a first insertion command. The controller starts the insertion interval timer, records an elapsed time period from the start of the insertion interval timer, and activates the first pump when the timer starts. The controller receives a second insertion command comprising information for activating the first pump for a second duty cycle for second insertion intervals different than the first insertion interval. If the second insertion interval is smaller than the recorded elapsed time period, the insertion interval timer is set for the second insertion interval, the insertion interval timer is started, and if not already activated, the first pump is activated for the second duty cycle.

20 Claims, 24 Drawing Sheets

(58) Field of Classification Search
CPC ......... F01N 2610/02; F01N 2610/1406; F01N 2610/144; F01N 2610/146; F01N 2900/0422; F01N 2900/1806; Y02T 10/12; Y02T 10/40
See application file for complete search history.

(56) References Cited

U.S. PATENT DOCUMENTS

| | | |
|---|---|---|
| 2011/0047971 A1 | 3/2011 | Mullins et al. |
| 2014/0352280 A1 | 12/2014 | Qi et al. |
| 2016/0061079 A1 | 3/2016 | Wentzel et al. |
| 2016/0084131 A1 | 3/2016 | Trivedi et al. |
| 2017/0089244 A1* | 3/2017 | Josh ..................... F01N 11/002 |

* cited by examiner

SYSTEMS AND METHODS FOR CONTROLLING PISTON PUMPS

CROSS-REFERENCE TO RELATED APPLICATIONS

The present application is a National Phase Application of PCT/US2019/021192, filed Mar. 7, 2019, which claims priority to and benefit of U.S. Provisional Application No. 62/640,375, filed Mar. 8, 2018 and entitled "Systems and Methods for Controlling Piston Pump". The contents of these applications are incorporated herein by reference in their entireties.

TECHNICAL FIELD

The present disclosure relates generally to aftertreatment systems for use with internal combustion (IC) engines.

BACKGROUND

Exhaust aftertreatment systems are used to receive and treat exhaust gas generated by IC engines. Generally, exhaust gas aftertreatment systems comprise any of several different components to reduce the levels of harmful exhaust emissions present in exhaust gas. For example, certain exhaust gas aftertreatment systems for diesel-powered IC engines comprise a selective catalytic reduction (SCR) system, including a catalyst formulated to convert NOx (NO and $NO_2$ in some fraction) into harmless nitrogen gas ($N_2$) and water vapor ($H_2O$) in the presence of ammonia ($NH_3$). Generally, in such aftertreatment systems, an exhaust reductant (e.g., a diesel exhaust fluid such as urea) is injected into the SCR system to provide a source of ammonia and mixed with the exhaust gas to partially reduce the NOx gases. The reduction byproducts of the exhaust gas are then fluidically communicated to the catalyst included in the SCR system to decompose substantially all of the NOx gases into relatively harmless byproducts that are expelled out of the aftertreatment system.

Some reductant insertion assemblies include piston pumps for insertion (e.g., pulsed delivery) of the reductant into the SCR system. Piston pumps are reciprocating positive displacement pumps that use a plunger or a piston to move a fluid through a cylindrical chamber. Piston pumps can deliver high pump pressures and are capable of handling a variety of fluids, for example, liquids (e.g., water, aqueous solutions, reductant, beverages, etc.), viscous fluids (e.g., blood, honey, polymers, putty, adhesives, etc.), fluids containing solids (e.g., slurries such as cement) and abrasive or corrosive fluids (e.g., beverage concentrates, acids, etc.). Conventional strategies for operating such piston pump generally provide a pulse width modulated (PWM) signal corresponding to a duty cycle of the pump, and an insertion frequency corresponding to an interval between subsequent insertions of the fluid by the piston pump. The piston pumps are activated each time a PWM signal is received regardless of a previous PWM signal. This may result in flow instabilities, particularly at higher pressures, which can lead to reduction in flow rate.

SUMMARY

Embodiments described herein relate generally to systems and methods for controlling operation of piston pumps, and in particular, to starting a timer for recording a time period corresponding to an initial time interval included in an initial insertion command configured to activate one or more pistons pumps, and starting the timer if a new insertion interval of a new insertion command is less than the time period recorded by the timer.

In some embodiments, a controller is configured to be operatively coupled to a reductant insertion assembly comprising a first pump configured to insert a reductant into a selective catalytic reduction system, the controller programmed to perform operations comprising: receive a first insertion command comprising information for activating the first pump for a first duty cycle, and for providing a first insertion interval between subsequent activations of the first pump; set an insertion interval timer for the first insertion interval, start the insertion interval timer, record an elapsed time period from the start of the insertion interval timer, and activate the first pump for the first duty cycle at the time of starting the insertion interval timer; receive a second insertion command comprising information for activating the first pump for a second duty cycle, and for providing a second insertion interval between subsequent activations of the first pump, the second insertion interval being different than the first insertion interval; and in response to determining that that the second insertion interval is smaller than the elapsed time period recorded by the insertion interval timer, set the insertion interval timer for the second insertion interval, start the insertion interval timer, and if the first pump is not already activated, activate the first pump for the second duty cycle at the time of starting the insertion interval timer.

In some embodiments, a method for controlling operations of a reductant insertion assembly that includes a first pump for inserting reductant into a selective catalytic reduction system, comprises: receiving a first insertion command comprising information for activating the first pump for a first duty cycle, and for providing a first insertion interval between subsequent activations of the first pump; setting an insertion interval timer for the first insertion interval, starting the insertion interval timer, recording an elapsed time period from the start of the insertion interval timer, and activating the first pump for the first duty cycle at the time of starting the insertion interval timer; receiving a second insertion command comprising information for activating the first pump for a second duty cycle, and for providing a second insertion interval between subsequent activations of the first pump, the second insertion interval being different than the first insertion interval; and in response to determining that that the second insertion interval is smaller than the elapsed time period recorded by the insertion interval timer, setting the insertion interval timer for the second insertion interval, starting the insertion interval timer, and if the first pump is not already activated, activating the first pump for the second duty cycle at the time of starting the insertion interval timer.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF THE DRAWINGS

The foregoing and other features of the present disclosure will become more fully apparent from the following description and appended claims taken in conjunction with the accompanying drawings. Understanding that these drawings depict only several implementations in accordance with the disclosure and are therefore not to be considered limiting of its scope, the disclosure will be described with additional specificity and detail through use of the accompanying drawings.

Figure 1:
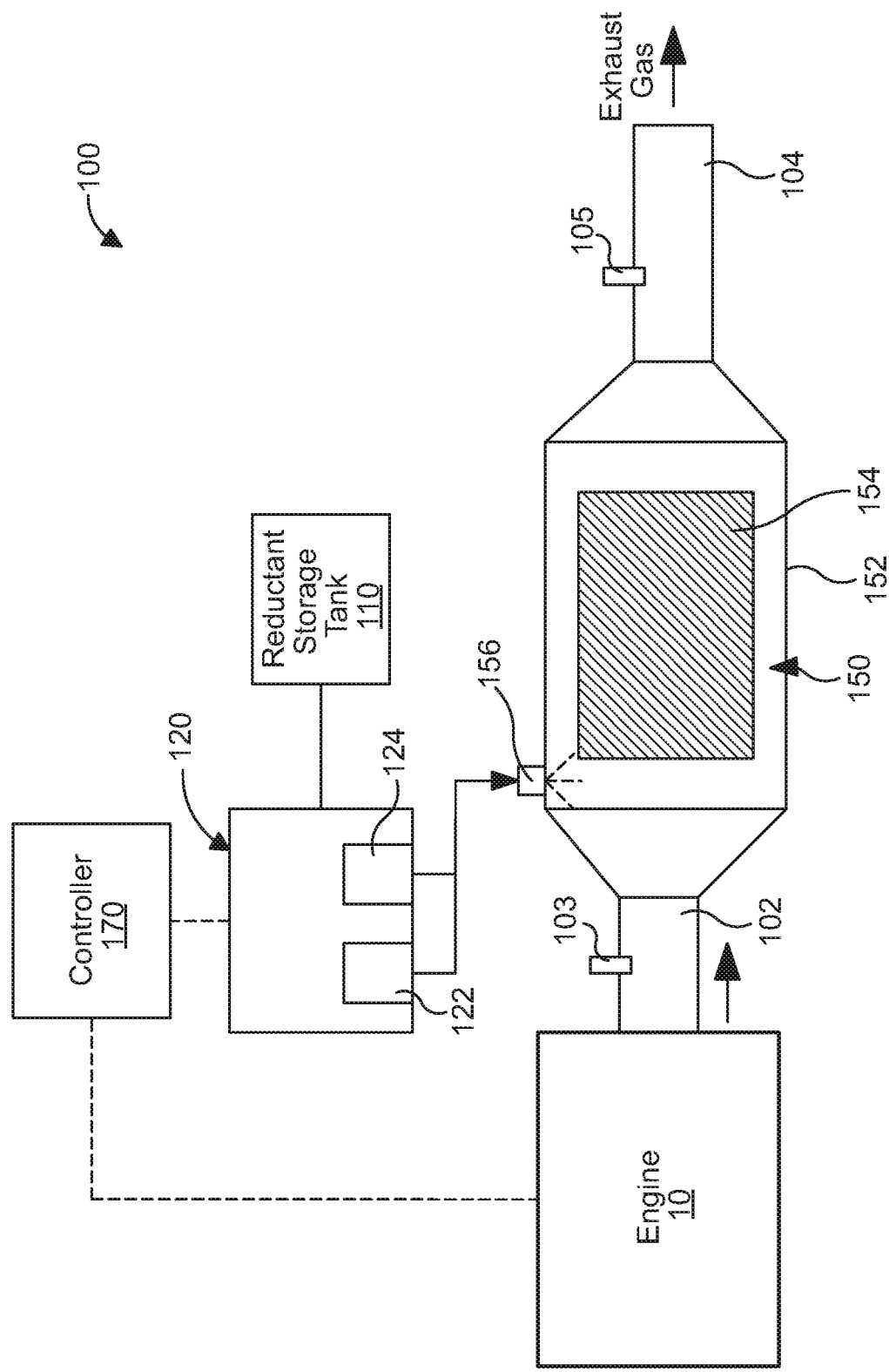
FIG. 1 is a schematic illustration of an aftertreatment system, according to an embodiment.

Reference is made to the accompanying drawings throughout the following detailed description. In the drawings, similar symbols typically identify similar components unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Embodiments described herein relate generally to systems and methods for controlling operation of piston pumps, and in particular, to starting a timer for recording a time period corresponding to an initial time interval included in an initial insertion command configured to activate one or more pistons pumps, and starting the timer if a new insertion interval of a new insertion command is less than the time period recorded by the timer.

Some reductant insertion assemblies include piston pumps for insertion (e.g., pulsed delivery) of the reductant into the SCR system. Conventional strategies for operating such piston pump generally provide a pulse width modulated (PWM) signal corresponding to a duty cycle of the pump, and an insertion frequency corresponding to an interval between subsequent insertions of the fluid by the piston pump. The piston pumps are activated each time a PWM signal is received, regardless of a previous PWM signal. This may result in flow instabilities, particularly at higher pressures, which can lead to reduction in flow rate.

Expanding further, the operating cycle of a piston pump includes a piston pull-in time and a piston hold time. Pull-in time corresponds to the time in which the piston of the piston pump moves from an OFF to an ON position (i.e., a piston stroke occurs), or is activated. The hold time corresponds to the time when the piston pump is held in the ON position as the fluid moves through the piston pump. The total time that that the piston pump takes to move from the OFF to the ON position and back to the OFF position (i.e., the piston stroke time) corresponds to a duty cycle of the piston pump which may be controlled, for example, to control a flow rate or a pressure of the fluid pumped by the piston pump. A pulse width module ("PWM") signal is often used to control the operation of such piston pumps with the PWM signal providing the duty cycle of the pump.

Furthermore, an insertion frequency corresponding to an insertion interval (reciprocal of the insertion frequency) or time period between each subsequent interval is used to time subsequent insertions by the piston pump. In conventional pumps, every time an insertion command is received, the piston pump is activated for the duty cycle with no regard to the previous duty cycle and insertion frequency. This can lead to instability in pump operation particular at high pressures where loss of flow rate may occur.

Various embodiments of the systems and methods described herein for controlling operation of a one or more pumps may provide benefits including, for example: (1) adjusting an insertion timing of a pump such as a piston pump by tracking a previous insertion interval and duty cycle of the pump to control operation of the pump; (2) allowing pumping at high pressures without impacting a flow rate of the fluid; and (3) reducing instabilities during operation of the pump.

FIG. 1 is a schematic illustration of an aftertreatment system 100, according to an embodiment. The aftertreatment system 100 is configured to receive an exhaust gas from an engine 10 (e.g., a diesel engine, a gasoline engine, a natural gas engine, a dual fuel engine, a biodiesel engine, an E-85 engine, or any other suitable engine) and reduce constituents of the exhaust gas such as, for example, NOx gases, CO, hydrocarbons, etc. The aftertreatment system 100 may comprise a reductant storage tank 110, a reductant insertion assembly 120, a SCR system 150 and a controller 170.

The SCR system 150 comprises a housing 152 defining an internal volume within which at least one catalyst 154 formulated to decompose constituents of an exhaust flowing therethrough is positioned. The housing 152 may be formed from a rigid, heat-resistant and corrosion-resistant material, for example stainless steel, iron, aluminum, metals, ceramics, or any other suitable material. The housing 152 may have any suitable cross-section, for example circular, square, rectangular, oval, elliptical, polygonal, or any other suitable shape.

In some embodiments, the SCR system 150 may comprise a selective catalytic reduction filter (SCRF) system, or any other aftertreatment component configured to decompose constituents of the exhaust gas (e.g., NOx gases such as such nitrous oxide, nitric oxide, nitrogen dioxide, etc.), flowing through the aftertreatment system 100 in the presence of a reductant, as described herein.

Although FIG. 1 shows only the catalyst 154 positioned within the internal volume defined by the housing 152, in other embodiments, a plurality of aftertreatment components may be positioned within the internal volume defined by the housing 152 in addition to the catalyst 154. Such aftertreatment components may comprise, for example, filters (e.g., particulate matter filters, catalyzed filters, etc.), oxidation catalysts (e.g., carbon monoxide, hydrocarbons and/or ammonia oxidation catalysts), mixers, baffle plates, or any other suitable aftertreatment component.

An inlet conduit 102 is fluidly coupled to an inlet of the housing 152 and structured to receive exhaust gas from the engine 10 and communicate the exhaust gas to an internal volume defined by the housing 152. Furthermore, an outlet conduit 104 may be coupled to an outlet of the housing 152 and structured to expel treated exhaust gas into the environment.

A first sensor 103 is positioned in the inlet conduit 102. The first sensor 103 may comprise a NOx sensor configured to measure an amount of NOx gases included in the exhaust gas flowing into the SCR system 150. The first sensor 103 may include a physical sensor or a virtual NOx sensor. In various embodiments, a temperature sensor, a pressure sensor, or any other sensor may also be positioned in the inlet conduit 102 so as to determine one or more operational parameters of the exhaust gas flowing through the aftertreatment system 100.

A second sensor 105 may be positioned in the outlet conduit 104. The second sensor 105 may comprise a second NOx sensor configured to determine an amount of NOx gases in the exhaust gas expelled into the environment after passing through the SCR system 150. In other embodiments, the second sensor 105 may comprise an ammonia oxide (AMOx) sensor configured to measure an amount of ammonia in the exhaust gas flowing out of the SCR system 150, i.e., determine the ammonia slip. This may be used as a measure for determining a catalytic efficiency of the SCR system 150, adjust an amount of reductant to be inserted into the SCR system 150, and/or adjust a temperature of the SCR system 150 so as to allow the SCR system 150 to effectively use the ammonia for catalytic decomposition of the NOx gases included in the exhaust gas flowing therethrough.

A reductant insertion port 156 may be provided on a sidewall of housing 152 and structured to allow insertion of a reductant therethrough into the internal volume defined by the housing 152. The reductant insertion port 156 may be positioned upstream of the catalyst 154 (e.g., to allow reductant to be inserted into the exhaust gas upstream of the catalyst 154) or over the catalyst 154 (e.g., to allow reductant to be inserted directly on the catalyst 154). In other embodiments, the reductant insertion port 156 may be disposed on the inlet conduit 102 and configured to insert the reductant into the inlet conduit 102 upstream of the SCR system 150. In such embodiments, mixers, baffles, vanes or other structures may be positioned in the inlet conduit 102 so as to facilitate mixing of the reductant with the exhaust gas.

The catalyst 154 is formulated to selectively decompose constituents of the exhaust gas. Any suitable catalyst can be used such as, for example, platinum, palladium, rhodium, cerium, iron, manganese, copper, vanadium based catalyst, any other suitable catalyst, or a combination thereof. The catalyst 154 can be disposed on a suitable substrate such as, for example, a ceramic (e.g., cordierite) or metallic (e.g., kanthal) monolith core which can, for example, define a honeycomb structure. A washcoat can also be used as a carrier material for the catalyst 154. Such washcoat materials may comprise, for example, aluminum oxide, titanium dioxide, silicon dioxide, any other suitable washcoat material, or a combination thereof. The exhaust gas (e.g., diesel exhaust gas) can flow over and/or about the catalyst 154 such that any NOx gases included in the exhaust gas are further reduced to yield an exhaust gas which is substantially free of NOx gases.

The reductant storage tank 110 is structured to store a reductant. The reductant is formulated to facilitate decomposition of the constituents of the exhaust gas (e.g., NOx gases included in the exhaust gas). Any suitable reductant can be used. In some embodiments, the exhaust gas comprises a diesel exhaust gas and the reductant comprises a diesel exhaust fluid. For example, the diesel exhaust fluid may comprise urea, an aqueous solution of urea, or any other fluid that comprises ammonia, by-products, or any other diesel exhaust fluid as is known in the arts (e.g., the diesel exhaust fluid marketed under the name ADBLUE®). For example, the reductant may comprise an aqueous urea solution having a particular ratio of urea to water. In particular embodiments, the reductant can comprise an aqueous urea solution including 32.5% by volume of urea and 67.5% by volume of deionized water, including 40% by volume of urea and 60% by volume of deionize water, or any other suitable ratio of urea to deionized water.

A reductant insertion assembly 120 is fluidly coupled to the reductant storage tank 110. The reductant insertion assembly 120 is configured to selectively insert the reductant into the SCR system 150 or upstream thereof (e.g., into the inlet conduit 102) or a mixer (not shown) positioned upstream of the SCR system 150. The reductant insertion assembly 120 may comprise various structures to facilitate receipt of the reductant from the reductant storage tank 110 and delivery to the SCR system 150.

For example, the reductant insertion assembly 120 comprises a first pump 122 for inserting the reductant into the SCR system 150. The reductant insertion assembly 120 may also comprise a second pump 124, for example, for inserting the reductant sequentially or in parallel with the first pump 122. In particular embodiments, the first pump 122 and the second pump 124 may comprise a piston pump, for example, a solenoid activated piston pump, an axial piston pump, a radial piston pump, or any other suitable piston pump. The pumps 122/124 are configured to be activated for a predetermined duty cycle, for example, via a PWM signal so as to insert the reductant into the SCR system 150 at a predetermined flow rate and/or pressure.

In various embodiments, the reductant insertion assembly 120 may also comprise one or more filter screens (e.g., to prevent solid particles of the reductant or contaminants from flowing into the pump) and/or valves (e.g., check valves) positioned upstream thereof to receive reductant from the reductant storage tank 110. Screens, check valves, pulsation dampers, or other structures may also be positioned downstream of the pumps 122/124 to provide the reductant to the SCR system 150. In various embodiments, the reductant insertion assembly 120 may also comprise a bypass line structured to provide a return path of the reductant from the pumps 122/124 to the reductant storage tank 110.

A valve (e.g., an orifice valve) may be provided in the bypass line. The valve may be structured to allow the reductant to pass therethrough to the reductant storage tank 110 if an operating pressure of the reductant generated by the pumps 122/124 exceeds a predetermined pressure so as to prevent over pressurizing of the pumps 122/124, the reductant delivery lines, or other components of the reductant insertion assembly 120. In some embodiments, the bypass line may be configured to allow the return of the reductant to the reductant storage tank 110 during purging of the reductant insertion assembly 120 (e.g., after the aftertreatment system 100 is shut off).

The controller 170 is communicatively coupled to the reductant insertion assembly 120 and configured to control an operation thereof. For example, the controller 170 may be communicatively coupled to each of the first pump 122 and the second pump 124 so as to control an activation of the pumps 122/124 and an insertion frequency corresponding to a time period between subsequent activations of the pumps 122/124 (i.e., an insertion interval), as described in further detail herein.

In some embodiments, the controller 170 may also be communicatively coupled to the engine 10 and configured to receive one or more engine operating parameter signals corresponding to one or engine operating parameters of the engine 10 therefrom. The controller 170 may be configured to interpret the engine operating parameter signals and determine the one or more engine operating parameter signals. In other embodiments, the controller 170 may additionally, or alternatively be coupled to the first sensor 103 and/or the second sensor 105. The controller 170 may be configured to receive and interpret a first sensor signal from the first sensor 103 (e.g., a first NOx sensor) and/or a second sensor signal from the second sensor 105 (e.g., the second NOx sensor) so as to determine various parameters of the exhaust gas (e.g., amount of NOx gases in the exhaust gas, exhaust gas temperature, exhaust gas flow rate, etc.). In various embodiments, the controller 170 may use the engine operating parameters and/or the parameters of the exhaust gas to determine flow rate, pressure and/or insertion frequency of the reductant into the SCR system 150, and control a duty cycle and/or insertion frequency of the pumps 122/124 accordingly.

The controller 170 may be operably coupled to the various components of the reductant insertion assembly 120, the first sensor 103, the second sensor 105, the engine 10 or any other component of the aftertreatment system 100 using any type and any number of wired or wireless connections. For example, a wired connection may include a serial cable, a fiber optic cable, a CAT5 cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections.

The controller 170 is configured to receive a first insertion command. The first insertion command comprises information for activating the first pump 122 for a first duty cycle, and for providing a first insertion interval between subsequent activations of the first pump 122. The first insertion interval may correspond to a first insertion frequency and is equal to a reciprocal of the first insertion frequency. For example, a first insertion frequency of 1 Hz corresponds to a first insertion interval (i.e., time period between subsequent insertions or otherwise activations of the first pump 122 for the first duty cycle) of 1,000 msec. Similarly, a first insertion frequency of 30 Hz corresponds to a first insertion interval of 33 msec.

In some embodiments, the controller 170 may receive the first insertion command from a central controller (e.g., an engine control unit). In other embodiments, the controller 170 may be configured determine one or more engine operating parameters, for example, by interpreting engine operating parameter signals received from the engine 10. The controller 170 may be configured to use the engine operating parameter signals to determine insertion parameters, i.e., the first duty cycle and the first insertion interval, for inserting the reductant into the SCR system 150 via the first pump 122 and/or the second pump 124. The controller 170 may generate the first insertion command comprising information for activating the first pump 122 for a first duty cycle, and for providing the first insertion interval between subsequent activations of the first pump 122.

Figure 2:
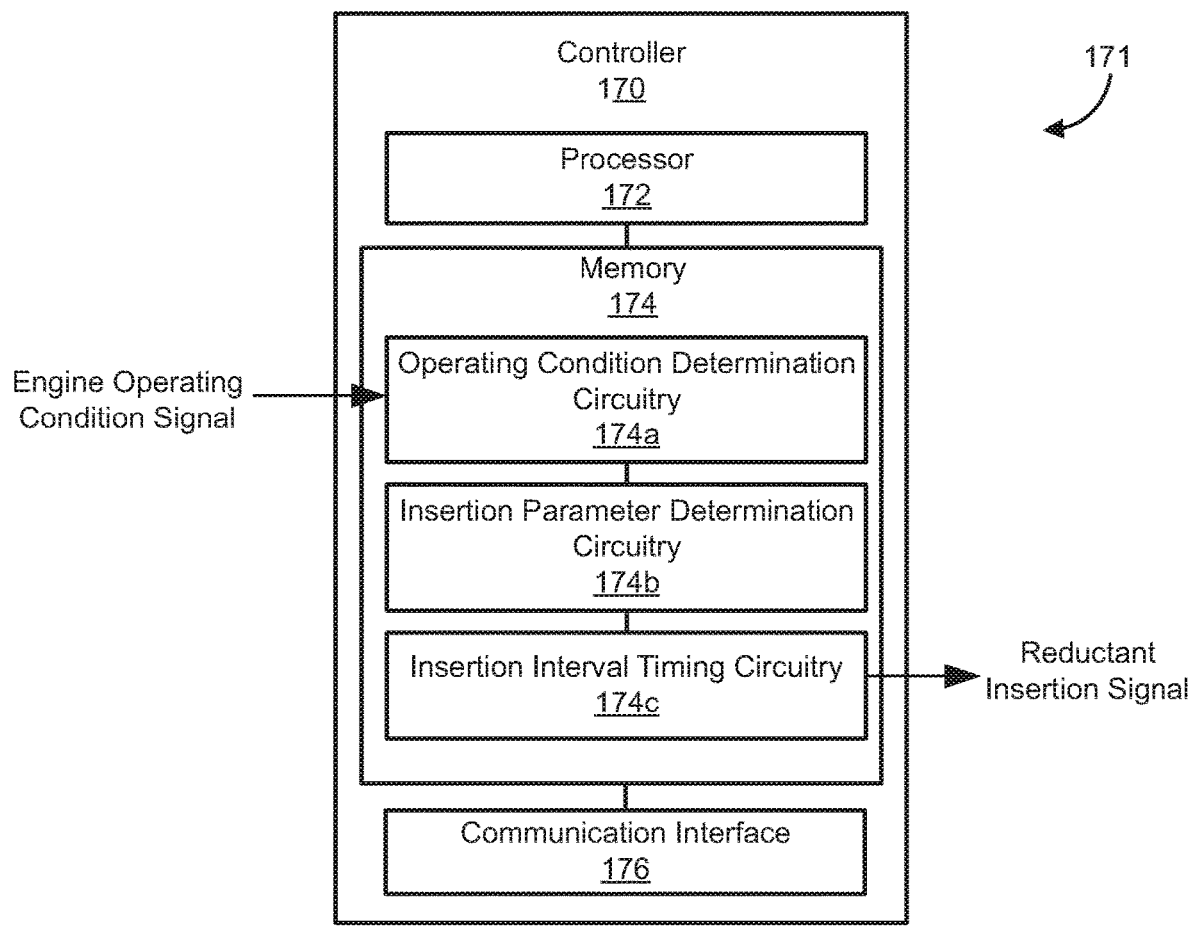
FIG. 2 is a schematic block diagram of an embodiment of a control circuitry that may be included in the aftertreatment system of FIG. 1.

A circuitry of the controller 170 (e.g., the insertion interval timing circuitry 174c as described with respect to FIG. 2) may receive the first insertion command from another circuitry of the controller 170 (e.g., the insertion parameter determination circuitry 174b as described with respect to FIG. 2), or from the central controller, and sets an insertion interval timer for the first insertion interval. The controller 170 starts the insertion interval timer, records an elapsed time period from the start of the insertion interval timer, and activates the first pump 122 for the first duty cycle at the time of starting the insertion interval timer.

For example, the controller 170 may include the insertion interval timer and sets the insertion interval timer for the first insertion interval. The insertion interval timer may start running when the first pump 122 is activated for the first duty cycle, and is configured to record an elapsed time period from the start of the insertion interval timer. If no other insertion command is received, the insertion interval timer continues to run until the elapsed time period is equal to the first insertion interval. For example, if the first insertion interval is 33 msec (corresponding to a first insertion frequency of 30 Hz) the insertion interval timer starts when the first pump 122 is activated for the first duty cycle (e.g., via a PWM signal) and runs for 33 msec. The insertion interval timer then sets and starts again for the first duty cycle, and the first pump 122 is activated again for the first duty cycle. The first pump 122 remains inactive during a portion of the elapsed time period after the first duty cycle is complete, until the insertion interval timer resets.

In some embodiments, the insertion interval timer may be set again (e.g., the elapsed time period is equal to the first insertion interval) by resetting the insertion interval timer to zero and restarting the insertion interval timer. In other embodiments, the insertion interval timer may continue to run so as to record a first elapsed time period. Once the first elapsed time period is equal to the first insertion interval or a new insertion command is received, the controller 170 records a second elapsed time period corresponding to a difference between the first elapsed time period and a total elapsed time period recorded by the insertion interval timer from a time point when the insertion interval timer was first started. Thus, the insertion interval timer is not reset for recording subsequent elapsed time periods.

In embodiments in which the reductant insertion assembly 120 also includes the second pump 124, the controller 170 may also be configured to activate the second pump 124 for the first duty cycle subsequent to activating the first pump 122. The second pump 124 is activated when the elapsed time period is equal to approximately 50% of first insertion interval. For example, the first insertion interval may be 33 msec (corresponding to a first insertion frequency of 30 Hz) and the controller 170 may be configured to activate the second pump 124 when the elapsed time period is 16.5 msec (i.e., 16.5 msec after activating the first pump 122). The timer does not set and start when the second pump 124 is activated for the first duty cycle, but continues to run until the elapsed time period is equal to the first insertion interval. The timer than sets (e.g., resets) the interval timer again for the first insertion interval, and starts, and the first pump 122 is activated again for the first duty cycle, and so on until a new insertion command is received.

In various embodiments, the reductant insertion assembly 120 may also include a third pump. In such embodiments, the controller 170 may be configured to activate the second pump 124 for the first duty cycle subsequent to activating the first pump 124, when the elapsed time period recorded by the insertion interval timer corresponds to approximately 33% of the first insertion interval. The controller 170 may also be configured to activate the third pump for the first duty cycle subsequent to activating the second pump 124 when the elapsed time period recorded by the insertion interval timer corresponds to approximately 66% of the first insertion interval. Thus, the reductant insertion assembly 120 may include any number of pumps and the controller 170 may be configured to sequentially activate each of the pumps based on an activation interval corresponding to the first insertion interval divided by the total number of pumps so as to provide an equal interval between activation of each of the pumps.

The controller 170 may receive a second insertion command. The second insertion command may comprise information for activating the first pump 122 for a second duty cycle, and for providing a second insertion interval between subsequent activations of the first pump 122 (i.e., activating the first pump 122 at a second insertion frequency) which may be different than the first insertion interval. For example, the controller 170 or the central controller may observe a change in the engine operation parameters, and or NOx amount in the exhaust gas, and determine the second duty cycle and second insertion interval for inserting the reductant into the SCR system 150 so as to meet the changing exhaust gas demand. In some embodiments, the second duty cycle may be the same as the first duty cycle.

In response to determining that that the second insertion interval is smaller than the time period recorded by the insertion interval timer, the controller 170 is configured to set the insertion interval timer for the second insertion interval, start the insertion interval timer and if the first pump is not already activated, activate the first pump 122 for the second duty cycle at the time of starting the insertion interval timer.

For example, the controller 170 may receive the second insertion command while the insertion interval timer is recording the elapsed time period corresponding to the first time interval, i.e., the elapsed time period is less than the first insertion interval. In some embodiments, the second insertion interval may be smaller than the elapsed time period recorded by the insertion interval timer. For example, the first insertion interval may be 1,000 msec (corresponding to a first insertion frequency of 1 Hz) and the second insertion interval may be 33 msec (corresponding to a first insertion frequency of 30 Hz). The insertion interval timer may have recorded an elapsed time period since activation of the first pump 122 of greater than 33 msec (i.e., the second insertion interval) but less than 1,000 msec (i.e., the first insertion interval) when the second insertion command is received, for example, when the elapsed time period is 600 msec. In such instances, the controller 170 is configured to set the insertion interval timer for the second insertion interval, start the insertion interval timer and activate the first pump 122 for the second duty cycle.

In some embodiments, the controller 170 may determine that the second insertion interval is larger than the elapsed time period recorded by the insertion interval timer. For example, the first insertion interval may be 33 msec (corresponding to a first insertion frequency of 30 Hz) and the second insertion interval may be 1,000 msec (corresponding to a first insertion frequency of 1 Hz), and the second insertion command is received when the elapsed time period is 20 msec. In such embodiments, the controller 170 may be configured to continue running the insertion interval timer until the elapsed time period is equal to the second insertion interval. The controller 170 sets the insertion interval timer for the second insertion interval, starts the insertion interval timer and activates the first pump 122 for the second duty cycle. In this manner, the controller 170 tracks a previous duty cycle and insertion frequency in real time and adjusts subsequent activations of the first pump 122 and/or the second pump 124 based on the previous insertion command so as to reduce pressure instabilities and prevent loss of flow rate.

In various embodiments, the controller 170 may be further configured to activate the second pump 124 subsequent to activating the first pump 122 for the second duty cycle. The second pump 124 is activated when the elapsed time period recorded by the insertion interval timer corresponds to approximately 50% of the second insertion interval, as previously described herein with respect to the first insertion interval. In particular embodiments, the controller 170 may be configured to receive the second insertion command before the second pump 124 is activated and the second insertion interval is less than the first insertion interval. In such embodiments, the controller 170 may be configured to activate the first pump 122 for the second duty cycle. The controller 170 is further configured to set the insertion interval timer for the second insertion interval, start the insertion interval timer, and activate the second pump 124 subsequent to activating the first pump 122 for the second duty cycle when the elapsed time period recorded by the insertion interval timer corresponds to approximately 50% of the second insertion interval.

For example, the first insertion interval may be 1,000 msec (corresponding to a first insertion frequency of 1 Hz) and the second insertion interval may be 33 msec (corresponding to a first insertion frequency of 30 Hz). In some implementations, the second insertion command is received when the elapsed time period recorded by the insertion interval timer is 600 msec. In such implementations, the controller 170 may activate the second pump 124 at 500 msec corresponding to the elapsed time period being approximately 50% of the first insertion interval. The first pump 122 is then activated at 600 msec, when the second insertion command is received.

In other implementations, the second insertion command may be received before the second pump 124 is activated, for example, at 400 msec when the elapsed time period is less than 50% of the first insertion interval (i.e., 500 msec). Since the second insertion interval of 33 msec is less than the elapsed time period of 400 msec, the timer sets for the second insertion interval, the insertion interval timer starts and the first pump 122 is activated for the second duty cycle. The second pump 124 may then be subsequently activated when the elapsed time period is equal to approximately 50% of the second insertion interval (i.e., 16.5 msec).

In particular embodiments, the controller 170 can be included in a control circuitry. For example, FIG. 2 is a schematic block diagram of a control circuitry 171 that comprises the controller 170, according to an embodiment. The controller 170 comprises a processor 172, a memory 174, or any other computer readable medium, and a communication interface 176. Furthermore, the controller 170 may include an operating condition determination circuitry 174a, an insertion parameter determination circuitry 174b and an insertion interval timing circuitry 174c. It should be understood that the controller 170 shows only one embodiment of the controller 170 and any other controller capable of performing the operations described herein can be used.

The processor 172 may comprise a microprocessor, programmable logic controller (PLC) chip, an ASIC chip, or any other suitable processor. The processor 172 is in communication with the memory 174 and configured to execute instructions, algorithms, commands, or otherwise programs stored in the memory 174. The memory 174 comprises any of the memory and/or storage components discussed herein. For example, memory 174 may comprise a RAM and/or cache of processor 172. The memory 174 may also comprise one or more storage devices (e.g., hard drives, flash drives, computer readable media, etc.) either local or remote to controller 170. The memory 174 is configured to store look up tables, algorithms, or instructions.

In one configuration, the operating condition determination circuitry 174a, the insertion parameter determination circuitry 174b and the insertion interval timing circuitry 174c are embodied as machine or computer-readable media (e.g., stored in the memory 174) that is executable by a processor, such as the processor 172. As described herein and amongst other uses, the machine-readable media (e.g., the memory 174) facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). Thus, the computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the operating condition determination circuitry 174a, the insertion parameter determination circuitry 174b and the insertion interval timing circuitry 174c embodied as hardware units, such as electronic control units. As such, the operating condition determination circuitry 174a, the insertion parameter determination circuitry 174b and the insertion interval timing circuitry 174c may be embodied as one or more circuitry components including, but not limited to, processing circuitry, network interfaces, peripheral devices, input devices, output devices, sensors, etc.

In some embodiments, the operating condition determination circuitry 174a, the insertion parameter determination circuitry 174b and the insertion interval timing circuitry 174c may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the operating condition determination circuitry 174a, the insertion parameter determination circuitry 174b and the insertion interval timing circuitry 174c may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

Thus, the operating condition determination circuitry 174a, the insertion parameter determination circuitry 174b and the insertion interval timing circuitry 174c may also include programmable hardware devices such as field programmable gate arrays, programmable array logic, programmable logic devices or the like. In this regard, the operating condition determination circuitry 174a, the insertion parameter determination circuitry 174b and the insertion interval timing circuitry 174c may include one or more memory devices for storing instructions that are executable by the processor(s) of the operating condition determination circuitry 174a, the insertion parameter determination circuitry 174b and the insertion interval timing circuitry 174c. The one or more memory devices and processor(s) may have the same definition as provided herein with respect to the memory 174 and the processor 172.

In the example shown, the controller 170 includes the processor 172 and the memory 174. The processor 172 and the memory 174 may be structured or configured to execute or implement the instructions, commands, and/or control processes described herein with respect to the operating condition determination circuitry 174a, the insertion parameter determination circuitry 174b and the insertion interval timing circuitry 174c. Thus, the depicted configuration represents the aforementioned arrangement where the operating condition determination circuitry 174a, the insertion parameter determination circuitry 174b and the insertion interval timing circuitry 174c are embodied as machine or computer-readable media. However, as mentioned above, this illustration is not meant to be limiting as the present disclosure contemplates other embodiments such as the aforementioned embodiment where the operating condition determination circuitry 174a, the insertion parameter determination circuitry 174b and the insertion interval timing circuitry 174c, or at least one circuit of the operating condition determination circuitry 174a, the insertion parameter determination circuitry 174b and the insertion interval timing circuitry 174c are configured as a hardware unit. All such combinations and variations are intended to fall within the scope of the present disclosure.

The processor 172 may be implemented as one or more general-purpose processors, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the operating condition determination circuitry 174a, the insertion parameter determination circuitry 174b and the insertion interval timing circuitry 174c) may comprise or otherwise share the same processor which, in some example embodiments, may execute instructions stored, or otherwise accessed, via different areas of memory). Alternatively, or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory 174 (e.g., RAM, ROM, Flash Memory, hard disk storage, etc.) may store data and/or computer code for facilitating the various processes described herein. The memory 174 may be communicably connected to the processor 172 to provide computer code or instructions to the processor 172 for executing at least some of the processes described herein. Moreover, the memory 174 may be or include tangible, non-transient volatile memory or non-volatile memory. Accordingly, the memory 174 may include database components, object code components, script components, or any other type of information structure for supporting the various activities and information structures described herein.

The communication interface 176 may include wireless interfaces (e.g., jacks, antennas, transmitters, receivers, communication interfaces, wire terminals, etc.) for conducting data communications with various systems, devices, or networks. For example, the communication interface 176 may include an Ethernet card and port for sending and receiving data via an Ethernet-based communications network and/or a Wi-Fi communication interface for communicating with various components of the reductant insertion assembly 120 (e.g., the first pump 122 and the second pump 124), the engine 10, the first sensor 103, the second sensor 105 or another controller (e.g., an engine control unit). The communication interface 176 may be structured to communicate via local area networks or wide area networks (e.g., the Internet, etc.) and may use a variety of communications protocols (e.g., IP, LON, Bluetooth, ZigBee, radio, cellular, near field communication, etc.).

The operating condition determination circuitry 174a may be configured to receive an engine operating condition signal from the engine 10 and interpret the engine operating condition signal so as to determine one or more engine operating parameters therefrom. The engine operating parameters may include, for example, engine speed, engine torque, engine load, fuel rate, an engine operating condition (e.g., lean, rich or stoichiometric), or any other engine operating condition. In some embodiments, the operating condition determination circuitry 174a may also be configured to receive a first sensor signal from the first sensor 103 and/or a second sensor signal from the second sensor 105. The operating condition determination circuitry 174a may be configured to interpret the first sensor signal and the second sensor signal to determine one or more parameters of the exhaust gas such as, for example, amount of NOx in exhaust gas, exhaust gas flow rate, exhaust gas temperature, etc.

The insertion parameter determination circuitry 174b may be configured to determine an amount, a flow rate and/or an insertion frequency of the reductant to be inserted into the SCR system 150. For example, the insertion parameter determination circuitry 174b may use the engine operating parameters and/or the one or more parameters of the exhaust gas to determine the amount, the flow rate and/or the insertion frequency of the reductant to be inserted into the SCR system 150. Furthermore, the insertion parameter determination circuitry 174b may be configured to determine one or more insertion parameters for the first pump 122 and/or the second pump 124 (e.g., the first duty cycle and the first insertion interval) for inserting the reductant into the SCR system 150 via the first pump 122 and/or the second pump 124, as previously described herein. The insertion parameter determination circuitry 174b may also be configured to generate an insertion command comprising information on a duty cycle for the first pump 122 and/or the second pump 124, and an insertion interval between subsequent activations of the first pump 122 and the second pump 124, i.e., the insertion frequency of the first pump 122 and/or the second pump 124.

The insertion interval timing circuitry 174c is configured to receive a first insertion command, for example, from the insertion parameter determination circuitry 174b. The first insertion command comprises information for activating the first pump 122 for a first duty cycle, and for providing a first insertion interval between subsequent activations of the first pump 122. The first insertion interval may correspond to a first insertion frequency and is equal to a reciprocal of the first insertion frequency, as previously described herein. The insertion interval timing circuitry 174c may generate a first pump reductant insertion signal configured to activate the first pump 122 for the first duty cycle between first insertion intervals.

The insertion interval timing circuitry 174c is also configured to set an insertion interval timer for the first insertion interval, start the insertion interval timer, and activate the first pump 122 for the first duty cycle at the time of starting the insertion interval timer. If no other insertion command is received, the insertion interval timer continues to run until the elapsed time period is equal to the first insertion interval. The insertion interval timer is then set again for the first insertion interval, and starts the insertion interval timer, and may be configured to generate another first reductant insertion signal configured to activate the first pump 122 again for the first duty cycle.

In some embodiments, the insertion interval timing circuitry 174c may also be configured to generate a second pump reductant insertion signal configured to activate the second pump 124 subsequent to activating the first pump 122 for the first duty cycle. The insertion interval timing circuitry 174c may be configured to activate second pump 124 for the first duty cycle when the elapsed time period recorded by the insertion interval timer corresponds to approximately 50% of first insertion interval. The insertion interval timer does not set when the second pump 124 is activated for the first duty cycle, but continues to run until the elapsed time period is equal to the first insertion interval. The insertion interval timer than sets again for the first insertion interval, restarts, and the first pump 122 is activated again for the first duty cycle, and so on as previously described herein.

The insertion interval timing circuitry 174c may also receive a second insertion command, for example, from the insertion parameter determination circuitry 174b. The second insertion command may comprise information for activating the first pump 122 for a second duty cycle, and for providing a second insertion interval between subsequent activations of the first pump 122 (i.e., activating the first pump 122 at a second insertion frequency) which may be different than the first insertion interval. For example, the operating condition determination circuitry 174a may observe a change in the engine operation parameters, and/or NOx amount in the exhaust gas, and the insertion parameter determination circuitry 174b may determine the second duty cycle and second insertion interval for inserting the reductant into the SCR system 150 so as to meet the changing exhaust gas demand. In some embodiments, the second duty cycle may be same as the first duty cycle.

In response to determining that that the second insertion interval is smaller than the time period recorded by the insertion interval timer, the insertion interval timing circuitry 174c may be configured to set the insertion interval timer for the second insertion interval, start the insertion interval timer, and if the first pump 122 is not already activated, activate the first pump 122 for the second duty cycle at the time of starting the insertion interval timer.

The insertion interval timing circuitry 174c may receive the second insertion command while the elapsed time period is less than the first insertion interval. In some embodiments, the second insertion interval may be smaller than the elapse time period recorded by the insertion interval timer. In such instances, the insertion interval timing circuitry 174c may be configured to set the insertion interval timer for the second insertion interval, start the insertion interval timer, and activate the first pump 122 for the second duty cycle.

In other embodiments, the insertion interval timing circuitry 174c may determine that the second insertion interval is larger than the elapsed time period recorded by the insertion interval timer. In such embodiments, the insertion interval timing circuitry 174c may be configured to continue running the insertion interval timer until the elapsed time period is equal to the second insertion interval. The insertion interval timing circuitry 174c may be further configured to set the insertion interval timer for the second insertion interval, start the insertion interval timer, and activate the first pump 122 for the second duty cycle.

In various embodiments, the insertion interval timing circuitry 174c may be further configured to activate the second pump 124 subsequent to activating the first pump 122 for the second duty cycle. The second pump 124 is activated when the elapsed time period corresponds to approximately 50% of second insertion interval. In particular embodiments, the insertion interval timing circuitry 174c may receive the second insertion command before the second pump 124 is activated and the second insertion interval is less than the elapsed time period. In such embodiments, the insertion interval timing circuitry 174c may be configured to set the insertion interval timer for the second insertion interval, start the insertion interval timer, and activate the first pump 122 for the second duty cycle. The insertion interval timing circuitry 174c may be configured to activate the second pump 124 subsequent to activating the first pump 122 for the second duty cycle when the elapsed time period corresponds to approximately 50% of second insertion interval, as previously described herein.

Figure 3:
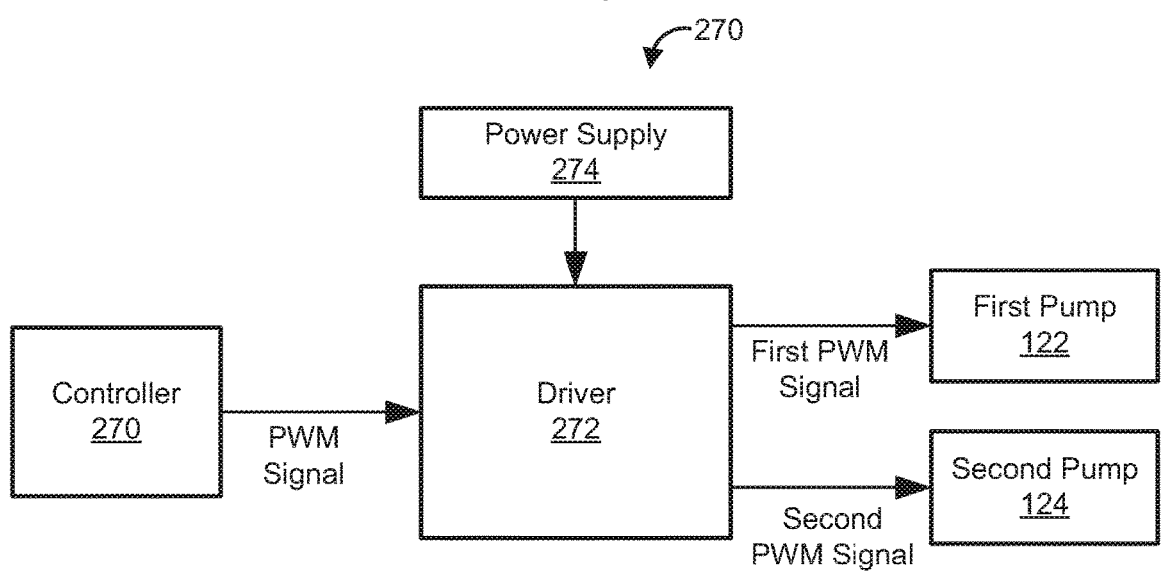
FIG. 3 is a schematic block diagram of an example control circuitry which may be used as the controller of FIG. 1, according to a specific embodiment.

FIG. 3 is a schematic block diagram of a control circuitry 270 which may be used to control the operation of the reductant insertion assembly 120 or any other assembly comprising one or more piston pumps, according to yet another embodiment. The control circuitry 270 comprises a controller 272. The controller 272 may be similar in structure and function to the controller 170 or the control circuitry 171 and therefore, not described in further detail herein. The control circuitry 270 also comprises a driver 274, and a power supply 276 configured to provide electrical power to the driver 274.

The controller 272 generates a PWM signal, for example, corresponding to the first duty cycle or the second duty cycle, as previously described herein. In some embodiments, the controller 272 may be configured to generate a 5V PWM signal. The power supply 276 may include a 12V or 24V power supply configured to power the driver 274. The driver 274 may be configured to receive the PWM signal from the controller 272 and generate a first PWM signal (e.g., a 12V/24V PWM signal) configured to drive the first pump 122 for the first duty cycle, and a second PWM signal (e.g., a 12V/24V PWM signal) configured to drive the second pump 124. For example, the driver 274 may generate the first PWM signal corresponding to the first duty cycle and a first insertion frequency, and generate the second PWM signal to drive the second pump 124 after approximately 50% of the first insertion interval has elapsed, as previously described herein.

Figure 4:
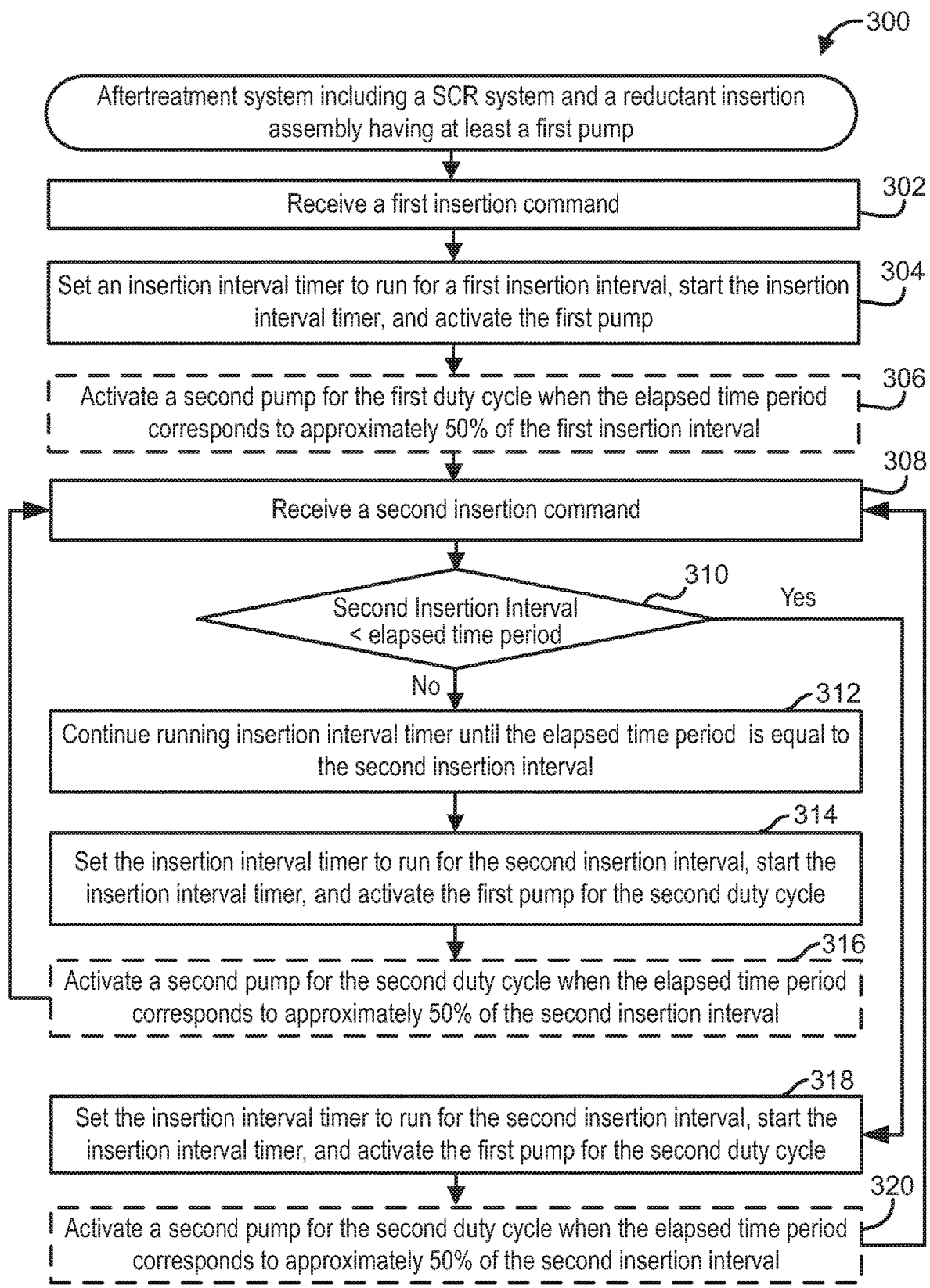
FIG. 4 is a schematic flow diagram of a method for controlling an operation of one or more pumps included in a reductant insertion assembly, according to an embodiment.

FIG. 4 is a schematic flow diagram of an example method 300 for controlling operation of at least a first pump (e.g., the first pump 122) included in a reductant insertion assembly (e.g., the reductant insertion assembly 120). The reductant insertion assembly may be configured to insert reductant into a SCR system (e.g., the SCR system 150) of an aftertreatment system (e.g., the aftertreatment system 100).

The method 300 is generally initiated when a first insertion command is received, at 302. For example, the controller 170 (e.g., the insertion interval timing circuitry 174c) may receive the first insertion command (e.g., from the insertion parameter determination circuitry 174b). The first insertion command comprises information for activating the first pump (e.g., the first pump 122) for a first duty cycle, and for providing a first insertion interval between subsequent activations of the first pump. The first insertion interval may correspond to a first insertion frequency and is equal to a reciprocal of the first insertion frequency, as previously described herein.

At 304, an insertion interval timer is set for the first insertion interval, the insertion interval timer is started, and the first pump is activated. For example, the insertion interval timing circuitry 174c may be configured to set the insertion interval timer for the first insertion interval, start the insertion interval timer, and activate the first pump 122 to run for the first duty cycle. If no other insertion command is received, the insertion interval timer may continue to run until the elapsed time period is equal to the first insertion interval. The insertion interval timer is then set again for the first insertion interval, the insertion interval timer is started, and the insertion interval timing circuitry 174c may be configured to generate another first reductant insertion signal configured to activate the first pump 122 again for the first duty cycle.

In some embodiments, the reductant insertion assembly (e.g., the reductant insertion assembly 120) may also comprise a second pump (e.g., the second pump 124). In such embodiments, the method 300 may also comprise activating the second pump for the first duty cycle when the elapsed time period is approximately 50% of the first insertion interval, at 306. For example, the insertion interval timing circuitry 174c may also be configured to generate a second pump reductant insertion signal configured to activate the second pump 124 subsequent for the first duty cycle to activating the first pump 122 when the time period recorded by the insertion interval timer corresponds to approximately 50% of first insertion interval. The insertion interval timer does not set when the second pump (e.g., the second pump 124) is activated for the first duty cycle, but continues to run until the elapsed time period is equal to the first insertion interval. The insertion interval timer is then set again for the first insertion interval, the insertion interval timer is started, and the first pump (e.g., the first pump 122) is activated again for the first duty cycle, and so on as previously described herein.

At 308, a second insertion command is received. For example, the insertion interval timing circuitry 174c may also receive the second insertion command, for example, from the insertion parameter determination circuitry 174b. The second insertion command may comprise information for activating the first pump (e.g., the first pump 122) for a second duty cycle, and for providing a second insertion interval between subsequent activations of the first pump (e.g., the first pump 122) which may be different than the first insertion interval. In some embodiments, the second duty cycle may be same as the first duty cycle.

At 310, it is determined if the second insertion interval is less than the elapsed time period recorded by the insertion interval timer. For example, the insertion interval timing circuitry 174c may compare the elapsed time period with the second insertion interval to determine if the second insertion interval is less than the elapsed time period. If it is determined that the second insertion interval is larger than the elapsed time period recorded by the insertion interval timer (e.g., by the insertion interval timing circuitry 174c), the insertion interval timer continues to run until the elapsed time period corresponds to the second insertion interval, at 312.

At 314, the insertion interval timer is set for the second insertion interval, the insertion interval timer is started, and the first pump is activated for the second duty cycle. For example, the insertion interval timing circuitry 174c may be configured to continue running the insertion interval timer until the elapsed time period is equal to the first insertion interval. The insertion interval timing circuitry 174c may then be configured to set the insertion interval timer for the second insertion interval, start the insertion interval timer and activate the first pump 122 for the second duty cycle.

In some embodiments, the second pump may be activated for the second duty cycle when the elapsed time period corresponds to approximately 50% of the second insertion interval, at 316. For example, the insertion interval timing circuitry 174c may be further configured to activate the second pump 124 subsequent to activating the first pump 122 for the second duty cycle. The second pump 124 is activated after the elapsed time period corresponds to approximately 50% of second insertion interval.

In response to determining that the second insertion interval is less than the elapsed time period, at operation 312, the method 300 proceeds to operation 318, and the insertion interval timer is set for the second insertion interval, the insertion interval timer is started, and the first pump is activated for the second duty cycle. For example, in response to determining that the second insertion interval is smaller than the time period recorded by the insertion interval timer, the insertion interval timing circuitry 174c may be configured to set the insertion interval timer for the second insertion interval, start the insertion interval time, and activate the first pump 122 to run for the second insertion interval. In various embodiments, the second insertion command may be received while elapsed time period is less than the first insertion interval.

In some embodiments, the second pump is activated for the second duty cycle when the elapsed time period recorded by the insertion interval timer corresponds to approximately 50% of the second insertion interval, at 320. For example, the insertion interval timing circuitry 174c may be configured to activate the second pump 124 subsequent to activating the first pump 122 for the second duty cycle when the elapsed time period corresponds to approximately 50% of second insertion interval. In particular embodiments, the second insertion command may be received (e.g., by the insertion interval timing circuitry 174c) before the second pump (e.g., the second pump 124) is activated and the second insertion interval is less than the first insertion interval. In such embodiments, insertion interval timer is set for the second insertion interval, the insertion interval timer started, and the first pump (e.g., the first pump 122) activated for the second duty cycle (e.g., by the insertion interval timing circuitry 174c.

It should be appreciated that while the systems and methods described herein are described with reference to controlling operation of one or more pumps included in a reductant insertion assembly such as the reductant insertion assembly 120, the concepts described herein are applicable to any apparatus, assembly or system including one or more pumps, for example, piston pumps. Such systems may include, but are not limited to those including piston pumps for pumping liquids (e.g., water, aqueous solutions, reductant, beverages, etc.), viscous fluids (e.g., blood, honey, polymers, putty, adhesives, etc.), fluids containing solids (e.g., slurries such as cement) and abrasive or corrosive fluids (e.g., beverage concentrates, acids, etc.).

EXPERIMENTAL EXAMPLES

FIGS. 5-24 are plots illustrating control of the operation of one or more pumps (e.g., piston pumps) included in a reductant insertion assembly using the systems and method described herein. These examples are for illustrative purposes only and should not be construed as limiting the disclosure in any shape or form.

Figure 5:
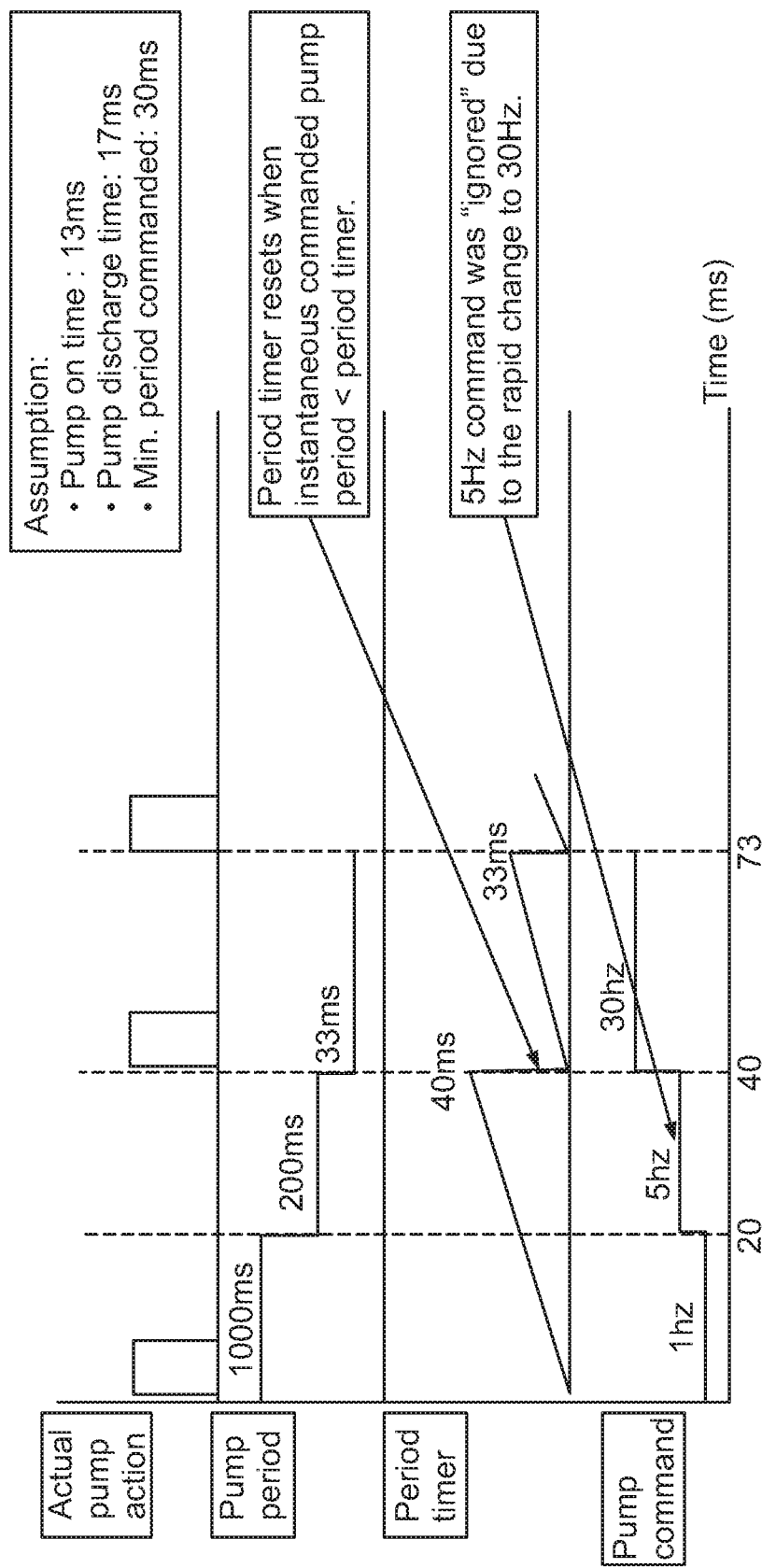
FIG. 5 are plots for controlling activation of a pump based on a first insertion command for activating the pump for a first duty cycle of 30 msec and insertion frequency of 1 Hz, a second insertion command for activating the pump for a second duty cycle of 30 msec and insertion frequency of 5 Hz received after 20 msec of the first insertion command, and a third insertion command for activating the pump for an initial duty cycle of 30 msec and insertion frequency of 30 Hz received after 40 msec of receiving the first insertion command.
Figure 6:
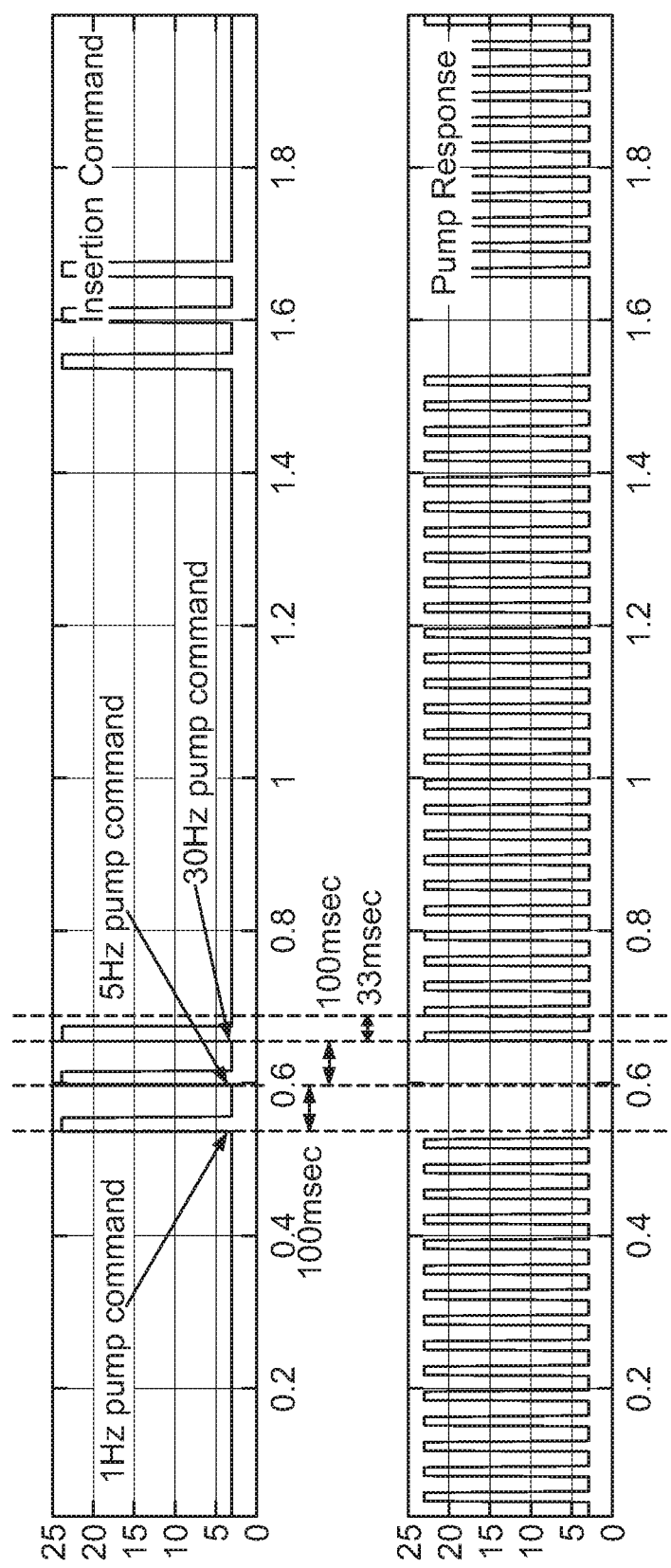
FIG. 6 are plots of insertion command versus pump response for the sequence of insertion commands described in FIG. 5 recorded over a period of 2 minutes.

FIG. 5 shows plots illustrating control of operation of a single pump included in a reductant insertion assembly. FIG. 6 are plots of insertion command versus pump response for the sequence of insertion commands described in FIG. 5 recorded over a period of 2 minutes. As shown in FIG. 5, the pump is activated based on a first insertion command for activating the pump for a first duty cycle of 30 msec and insertion frequency of 1 Hz (i.e., a first insertion interval of 1,000 msec). The insertion interval timer starts when the first insertion command is received and is configured to run until the elapsed time period is equal to the first insertion interval, i.e., 1,000 msec. A second insertion command for activating the pump for a second duty cycle of 30 msec and insertion frequency of 5 Hz (i.e., a second insertion interval of 200 msec) is received when the elapsed time period is equal to 20 msec. Since the second insertion interval of 200 msec is greater than the time period recorded by the insertion interval timer (i.e., 20 msec), the insertion interval timer continues to run, but is now configured to run until the elapsed time period is equal to the second insertion interval, i.e., 200 msec.

A third insertion command for activating the pump for a third duty cycle of 30 msec and insertion frequency of 30 Hz (i.e., a third insertion interval of 33 msec) is received when the elapsed time period is equal to 20 msec. Since the third insertion interval of 33 msec is less than the time period recorded by the insertion interval timer (i.e., 40 msec) and is received before the elapsed time period is equal to the second insertion interval, the second insertion command is ignored. The insertion interval timer resets and restarts, and the pump is activated for the third duty cycle. The insertion interval timer continues to run until the elapsed time period is equal to the third insertion interval of 33 msec. The pump is then reactivated and the timer resets and restarts. This continues until a new insertion command is received, as shown in FIG. 6.

Figure 7:
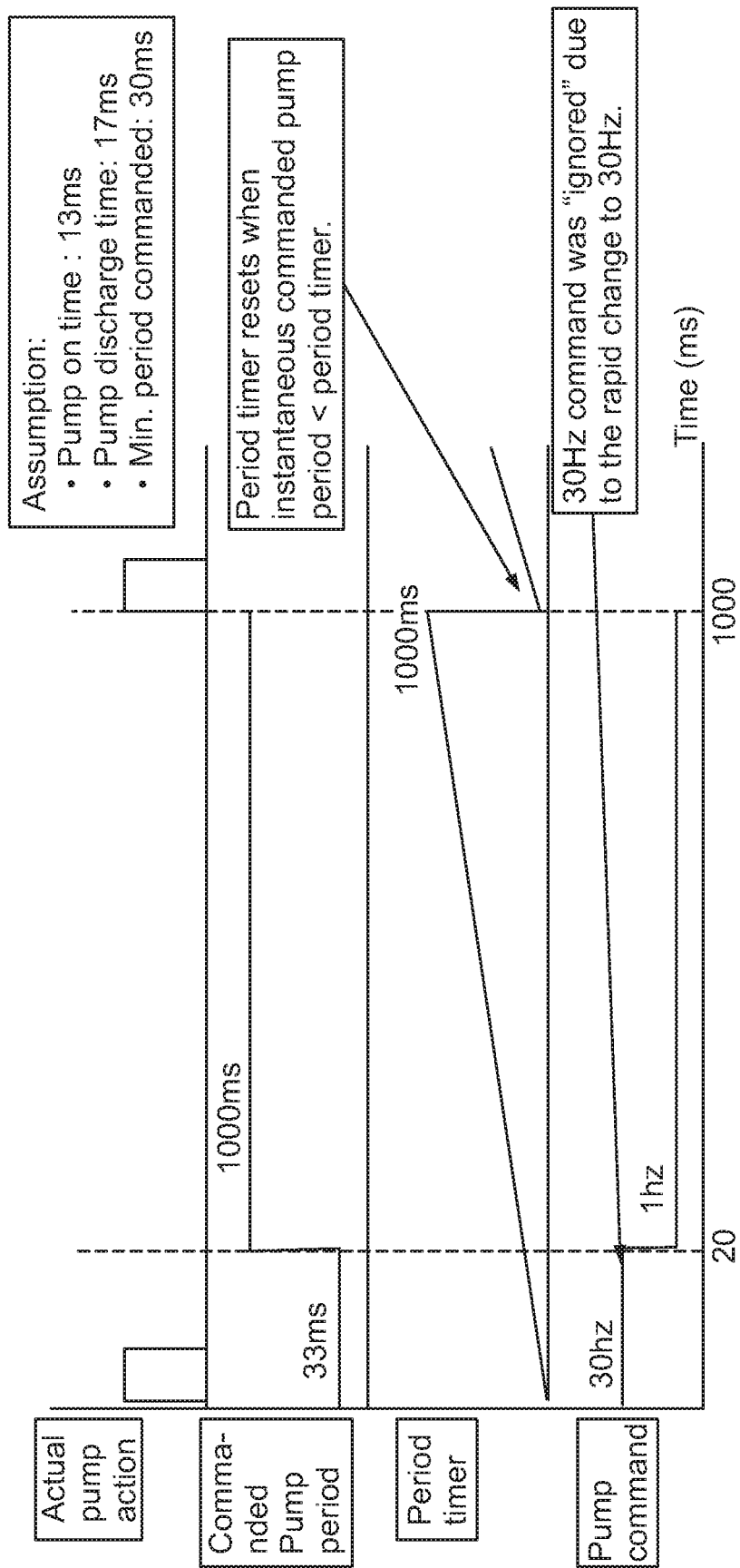
FIG. 7 are plots for controlling activation of a pump based on a first insertion command for activating the pump for a first duty cycle of 30 msec and insertion frequency of 30 Hz, and a second insertion command for activating the pump for a second duty cycle of 30 msec and a second insertion frequency of 1 Hz received after 20 msec of the first insertion command.
Figure 8:
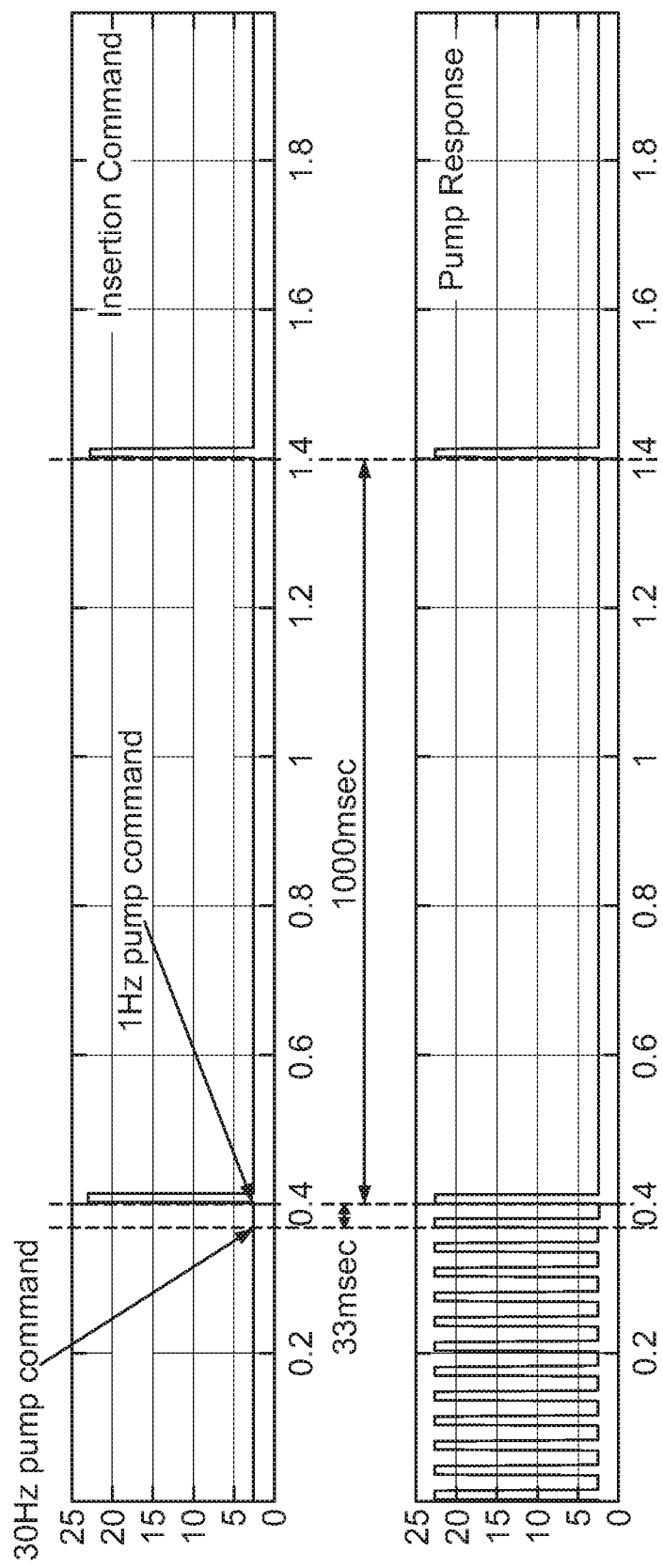
FIG. 8 are plots of insertion command versus pump response for the sequence of insertion commands described in FIG. 7 recorded over a period of 2 minutes.

FIG. 7 shows plots illustrating control of operation of a single pump included in a reductant insertion assembly. FIG. 8 are plots of insertion command versus pump response for the sequence of insertion commands described in FIG. 7 recorded over a period of 2 minutes. As shown in FIG. 7, the pump is activated based on a first insertion command for activating the pump for a first duty cycle of 30 msec and insertion frequency of 30 Hz (i.e., a first insertion interval of 33 msec). The insertion interval timer starts when the first insertion command is received and is configured to run until the elapsed time period is equal to the first insertion interval, i.e., 33 msec. A second insertion command for activating the pump for a second duty cycle of 30 msec and insertion frequency of 1 Hz (i.e., a second insertion interval of 1,000 msec) is received when the elapsed time period is equal to 20 msec. Since the second insertion interval of 1,000 msec is greater than the time period recorded by the insertion interval timer (i.e., 20 msec), the insertion interval timer continues to run, but is now configured to run until the elapsed time period is equal to the second insertion interval, i.e., 1,000 msec. Once the elapsed time period is equal to the second insertion interval, i.e., 1,000 msec, the insertion interval timer resets and restarts, and the pump is activated for the second duty cycle. This continues until a new insertion command is received, as shown in FIG. 8.

Figure 9:
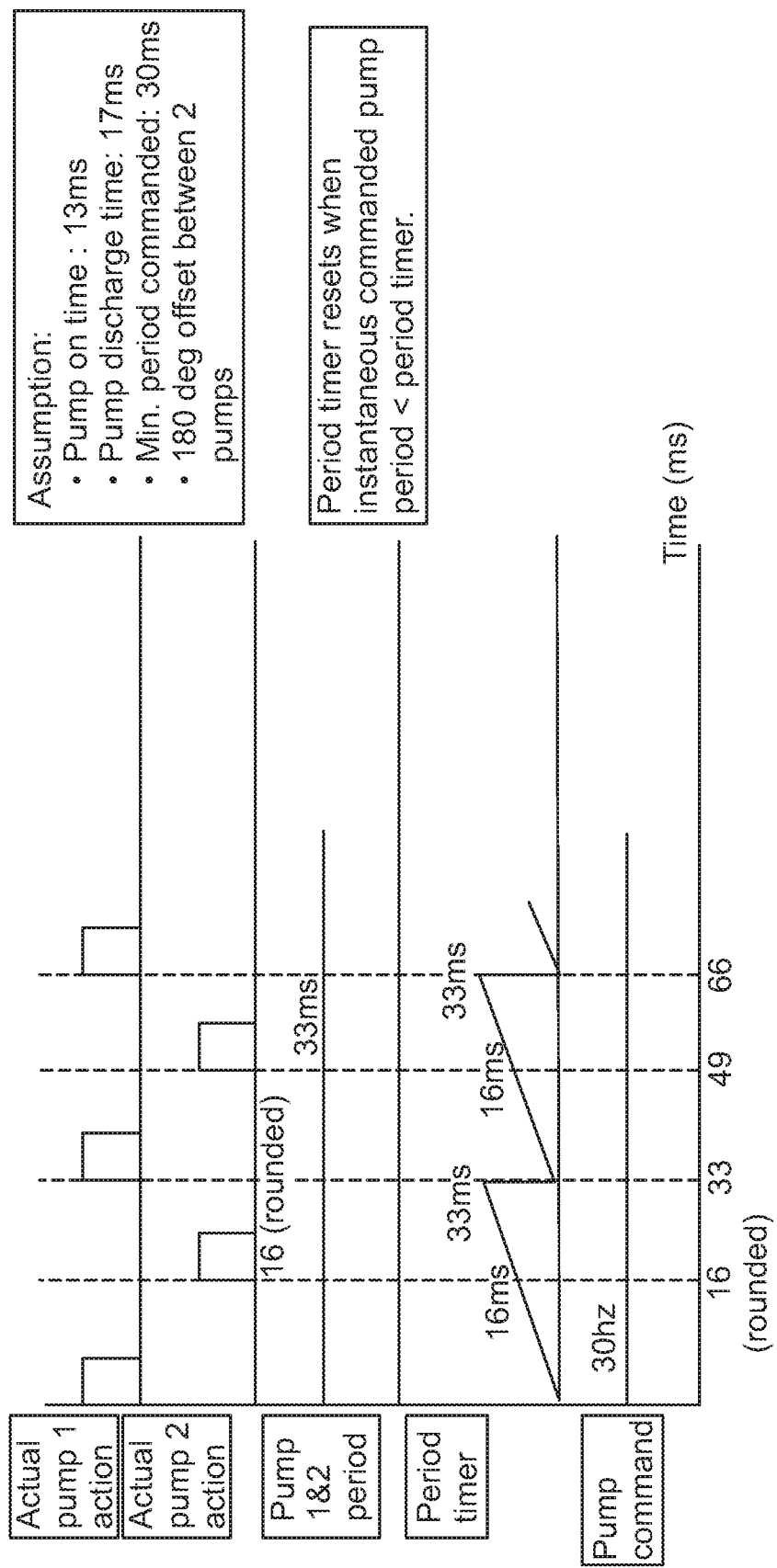
FIG. 9 are plots for controlling activation of a first pump and a second pump based on a first insertion command for activating the first and second pump for a first duty cycle of 30 msec and insertion frequency of first pump of 30 Hz.
Figure 10:
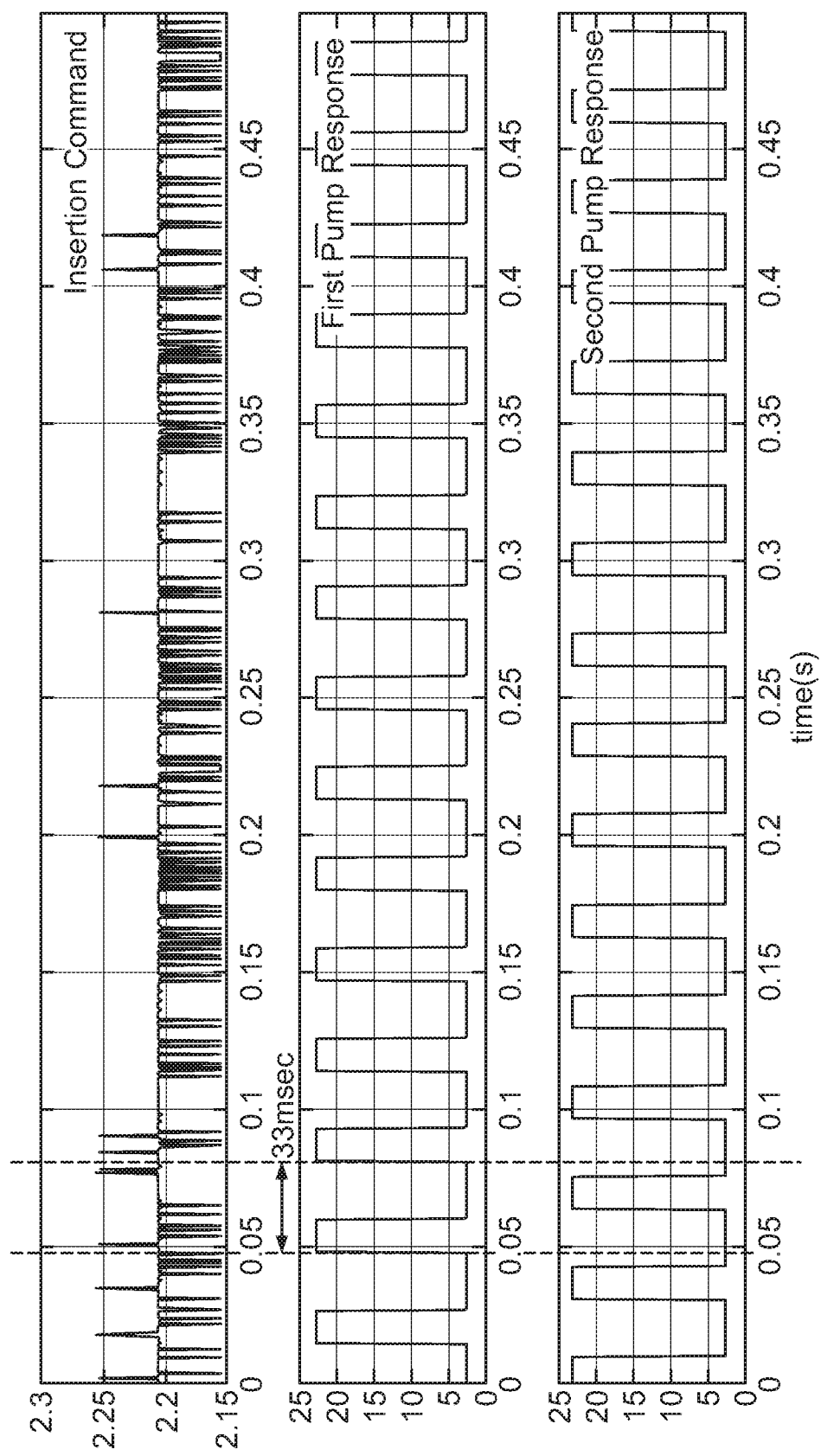
FIG. 10 are plots of insertion command versus first pump and second pump response for the sequence of insertion commands described in FIG. 9 recorded over a period of 0.5 seconds.

FIG. 9 are plots for controlling activation of a first pump (pump 1) and a second pump (pump 2) included in a reductant insertion assembly. FIG. 10 are plots of insertion command versus pump response for the sequence of insertion commands described in FIG. 9 recorded over a period of 0.5 seconds. As shown in FIG. 9, pump 1 is activated based on a first insertion command for activating pump 1 for a first duty cycle of 30 msec and insertion frequency of 30 Hz (i.e., a first insertion interval of 33 msec). The insertion interval timer starts when the first insertion command is received and is configured to run until the elapsed time period is equal to the first insertion interval, i.e., 33 msec. Pump 2 is activated for the first duty cycle when the elapsed time period is approximately 50% of the first insertion interval, i.e., 16.5 msec. The insertion interval timer resets and restarts when the elapsed time period is equal to the first insertion interval, i.e., 33 msec and pump 1 is reactivated for the first duty cycle. The process repeats until a new insertion command is received, as shown in FIG. 10.

Figure 11:
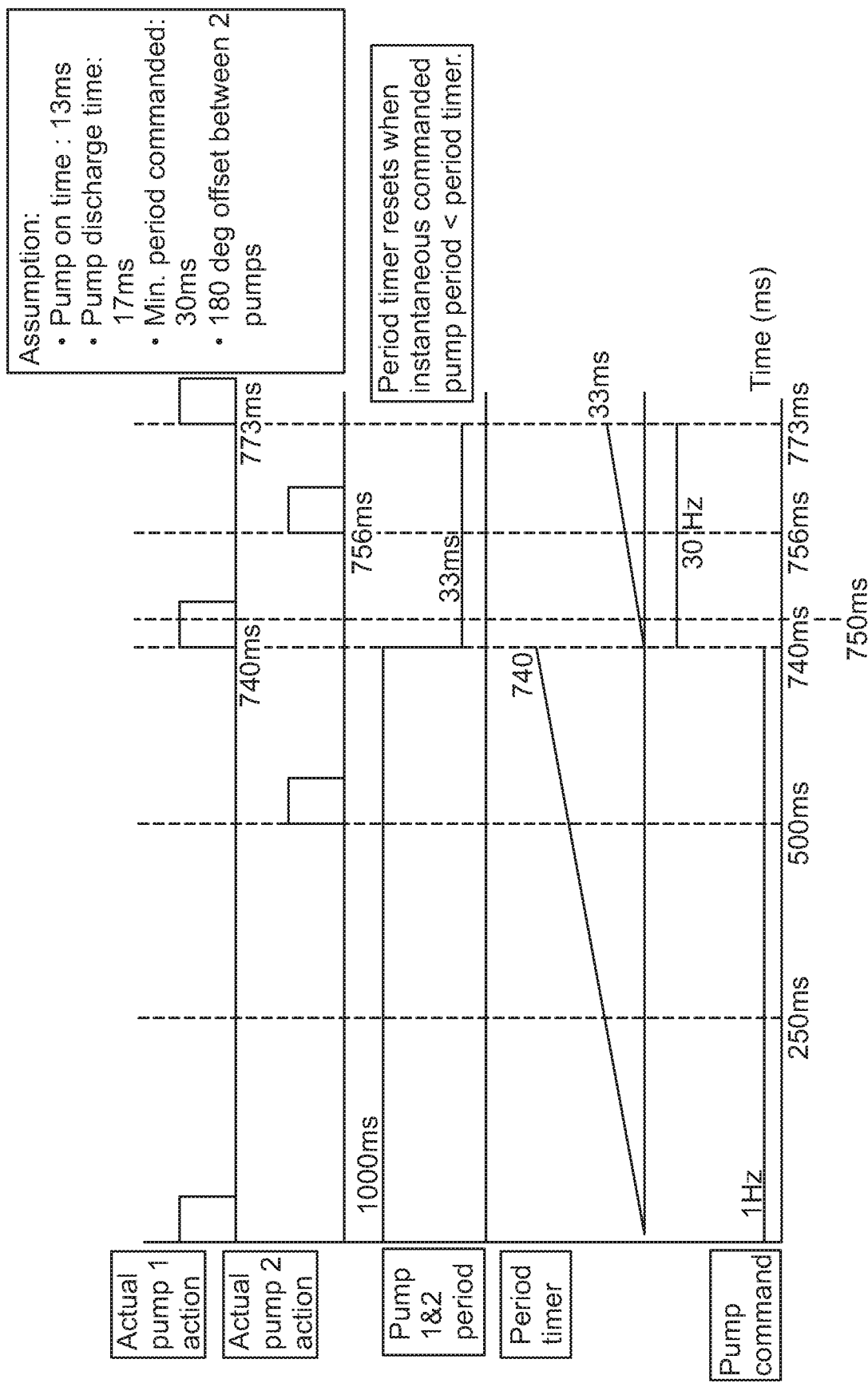
FIG. 11 are plots for controlling activation of a first pump and a second pump based on a first insertion command for activating the first and second pumps for a first duty cycle of 30 msec and insertion frequency of 1 Hz, and a second insertion command for activating the first and second pumps for a second duty cycle of 30 msec and insertion frequency of 30 Hz received after 740 msec of the first insertion command.
Figure 12:
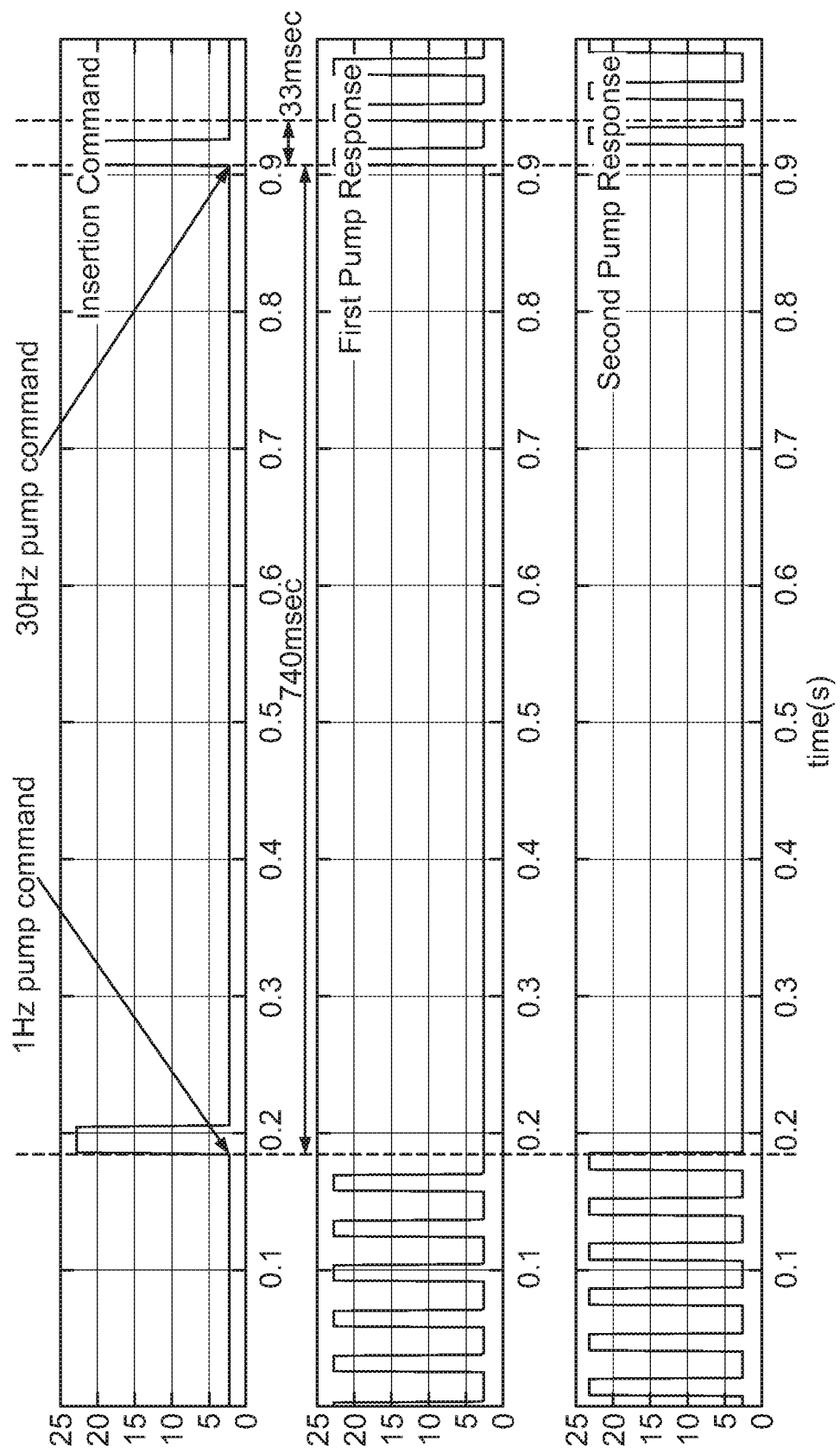
FIG. 12 are plots of insertion command versus first pump and second pump response for the sequence of insertion commands described in FIG. 11 recorded over a period of 1 minute.

FIG. 11 are plots for controlling activation of a first pump (pump 1) and a second pump (pump 2) included in a reductant insertion assembly. FIG. 12 are plots of insertion command versus pump response for the sequence of insertion commands described in FIG. 11 recorded over a period of 1 minute. As shown in FIG. 11, pump 1 is activated based on a first insertion command for activating pump 1 for a first duty cycle of 30 msec and insertion frequency of 1 Hz (i.e., a first insertion interval of 1,000 msec). The insertion interval timer starts when the first insertion command is received and is configured to run until the elapsed time period is equal to the first insertion interval, i.e., 1,000 msec. Pump 2 is activated for the first duty cycle when the elapsed time period corresponds to approximately 50% of the first insertion interval, i.e., 500 msec.

A second insertion command for activating pump 1 for a second duty cycle of 30 msec and insertion frequency of 30 Hz (i.e., a second insertion interval of 33 msec) is received when the elapsed time period is equal to 740 msec. Since the second insertion interval of 33 msec is less than the time period recorded by the insertion interval timer (i.e., 740 msec), the insertion interval timer resets and restarts, and pump 1 is activated for the second duty cycle. Pump 2 is activated when the elapsed time period after insertion interval timer restart is equal to approximately 50% of the second insertion interval, i.e., 16.5 msec. The insertion interval timer continues to run until the elapsed time period is equal to the second insertion interval of 33 msec. Pump 1 is then reactivated and the timer resets and restarts. This continues until a new insertion command is received, as shown in FIG. 12.

Figure 13:
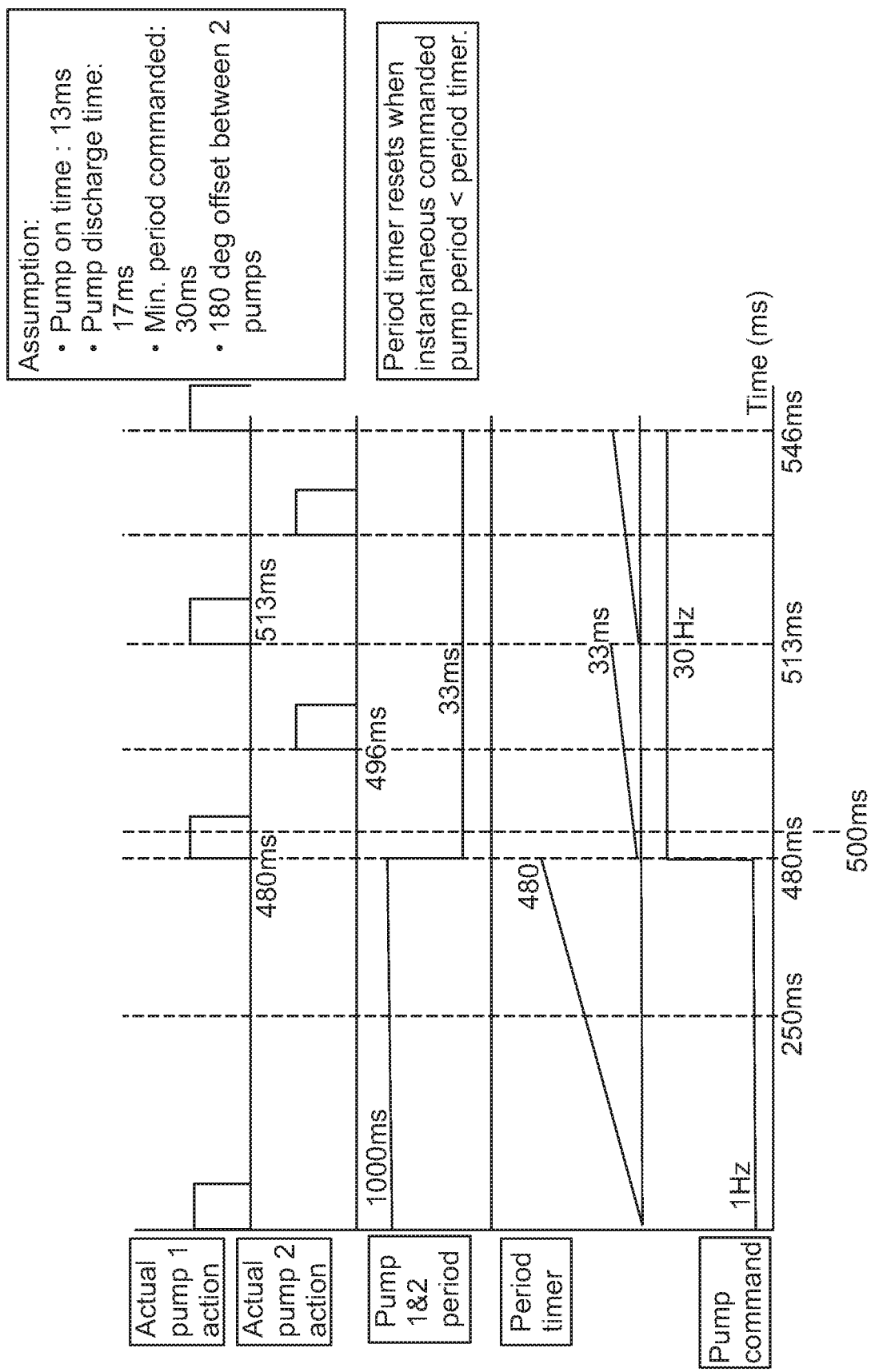
FIG. 13 are plots for controlling activation of a first pump and a second pump based on a first insertion command for activating the first and second pumps for a first duty cycle of 30 msec and insertion frequency of 1 Hz, and a second insertion command for activating the first and second pumps for a second duty cycle of 30 msec and insertion frequency of 30 Hz received after 480 msec of the first insertion command.
Figure 14:
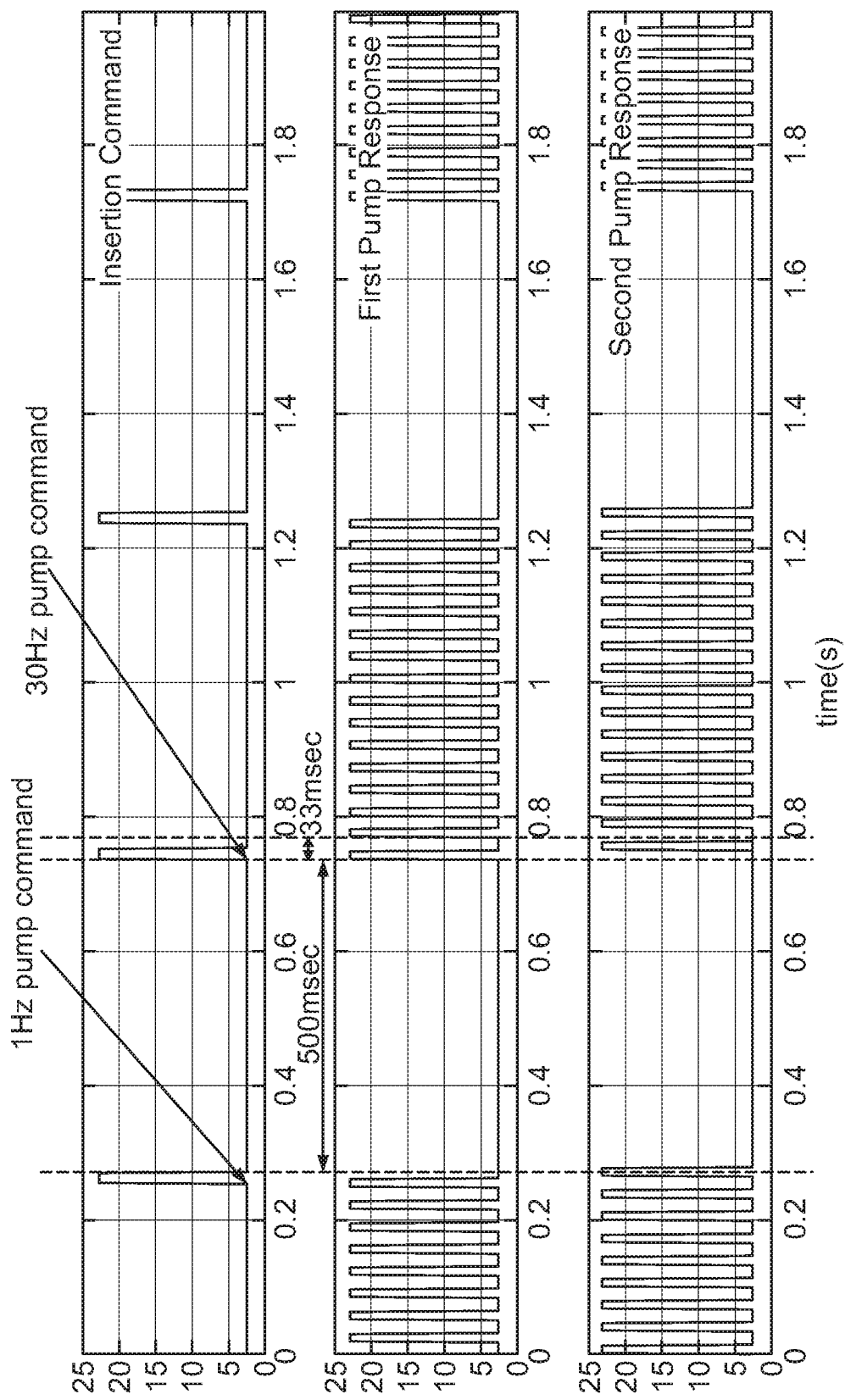
FIG. 14 are plots of insertion command versus first pump and second pump response for the sequence of insertion commands described in FIG. 13 recorded over a period of 2 minutes.

FIG. 13 are plots for controlling activation of a first pump (pump 1) and a second pump (pump 2) included in a reductant insertion assembly. FIG. 14 are plots of insertion command versus pump response for the sequence of insertion commands described in FIG. 13 recorded over a period of 2 minutes. As shown in FIG. 13, pump 1 is activated based on a first insertion command for activating pump 1 for a first duty cycle of 30 msec and insertion frequency of 1 Hz (i.e., a first insertion interval of 1,000 msec). The insertion interval timer starts when the first insertion command is received and is configured to run until the elapsed time period is equal to the first insertion interval, i.e., 1,000 msec.

A second insertion command for activating pump 1 for a second duty cycle of 30 msec and insertion frequency of 30 Hz (i.e., a second insertion interval of 33 msec) is received when the elapsed time period is equal to 480 msec. Since the second insertion interval of 33 msec is less than the time period recorded by the insertion interval timer (i.e., 480 msec), and is received before pump 2 is activated (i.e., the elapsed time period is less than 50% of the first insertion interval of 500 msec), the insertion interval timer resets and restarts, and pump 1 is activated for the second duty cycle. Pump 2 is activated when the elapsed time period after insertion interval timer restart is equal to approximately 50% of the second insertion interval, i.e., 16.5 msec. The insertion interval timer continues to run until the elapsed time period is equal to the second insertion interval of 33 msec. Pump 1 is then reactivated and the timer resets and restarts. This continues until a new insertion command is received, as shown in FIG. 14.

Figure 15:
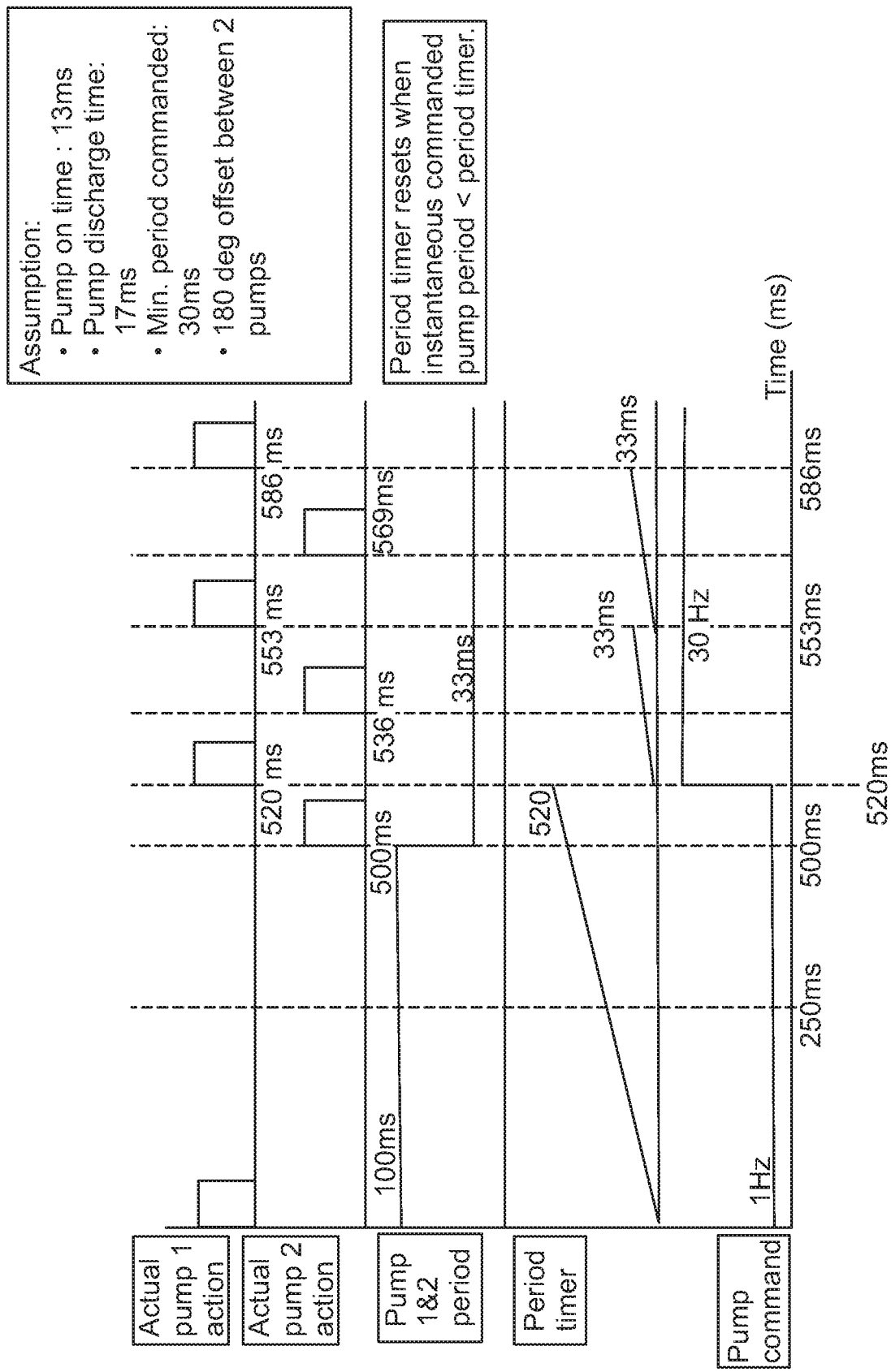
FIG. 15 are plots for controlling activation of a first pump and a second pump based on a first insertion command for activating the first and second pumps for a first duty cycle of 30 msec and insertion frequency of 1 Hz, and a second insertion command for activating the first and second pumps for a second duty cycle of 30 msec and insertion frequency of 30 Hz received after 520 msec of the first insertion command.
Figure 16:
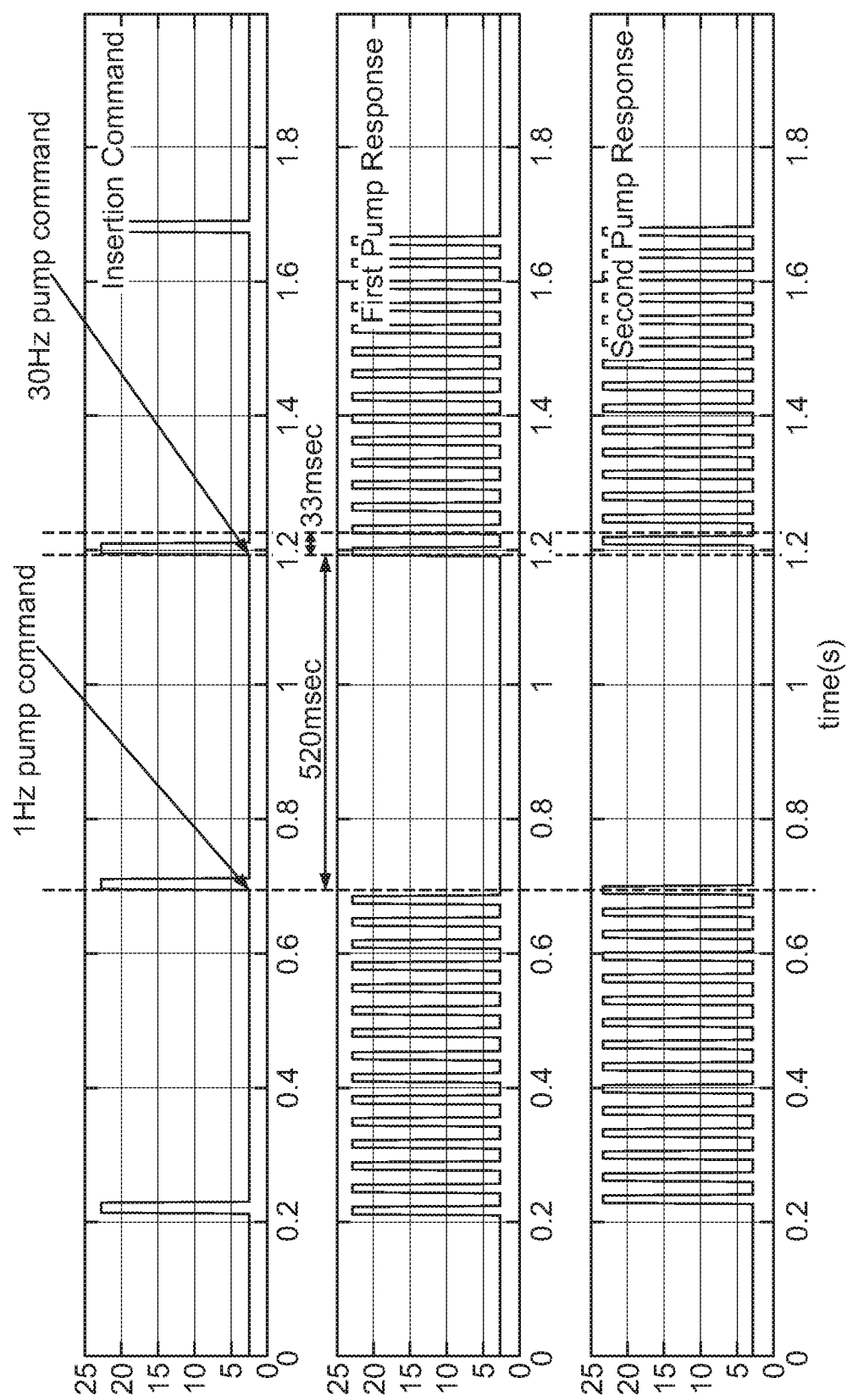
FIG. 16 are plots of insertion command versus first pump and second pump response for the sequence of insertion commands described in FIG. 15 recorded over a period of 2 minutes.

FIG. 15 are plots for controlling activation of a first pump (pump 1) and a second pump (pump 2) included in a reductant insertion assembly. FIG. 16 are plots of insertion command versus pump response for the sequence of insertion commands described in FIG. 15 recorded over a period of 2 minutes. As shown in FIG. 15, pump 1 is activated based on a first insertion command for activating pump 1 for a first duty cycle of 30 msec and insertion frequency of 1 Hz (i.e., a first insertion interval of 1,000 msec). The insertion interval timer starts when the first insertion command is received and is configured to run until the elapsed time period is equal to the first insertion interval, i.e., 1,000 msec. Pump 2 is activated for the first duty cycle when the elapsed time period corresponds to approximately 50% of the first insertion interval, i.e., 500 msec.

A second insertion command for activating pump 1 for a second duty cycle of 30 msec and insertion frequency of 30 Hz (i.e., a second insertion interval of 33 msec) is received when the elapsed time period is equal to 520 msec. Since the second insertion interval of 33 msec is less than the time period recorded by the insertion interval timer (i.e., 520 msec), the insertion interval timer resets and restarts, and pump 1 is activated for the second duty cycle. Pump 2 is activated when the elapsed time period after insertion interval timer restart is equal to approximately 50% of the second insertion interval, i.e., 16.5 msec. The insertion interval timer continues to run until the elapsed time period is equal to the second insertion interval of 33 msec. Pump 1 is then reactivated and the timer resets and restarts. This continues until a new insertion command is received, as shown in FIG. 16.

Figure 17:
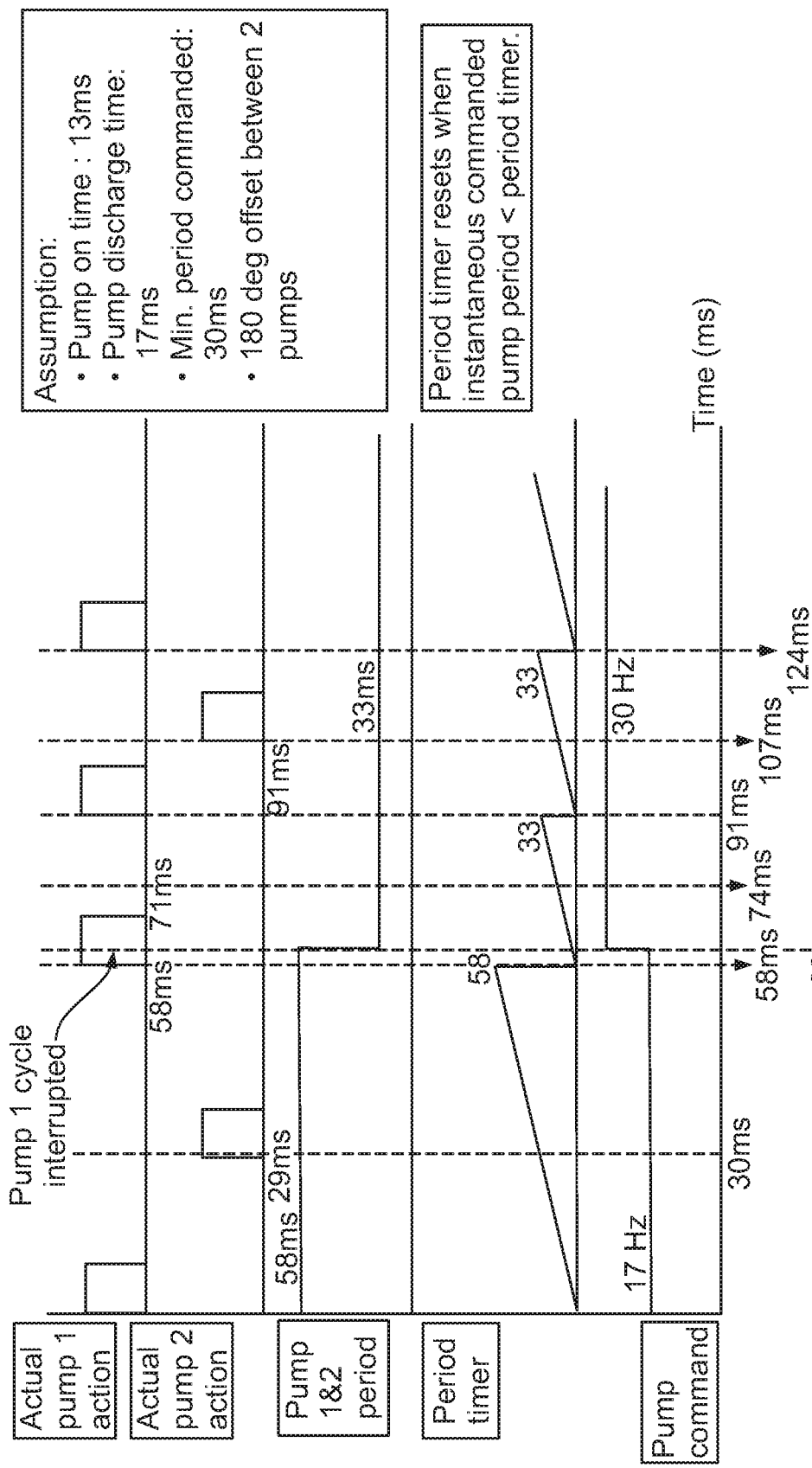
FIG. 17 are plots for controlling activation of a first pump and a second pump based on a first insertion command for activating the first and second pumps for a first duty cycle of 30 msec and insertion frequency of 17 Hz, and a second insertion command for activating the first and second pumps for a second duty cycle of 30 msec and insertion frequency of 30 Hz received after 58 msec of the first insertion command.
Figure 18:
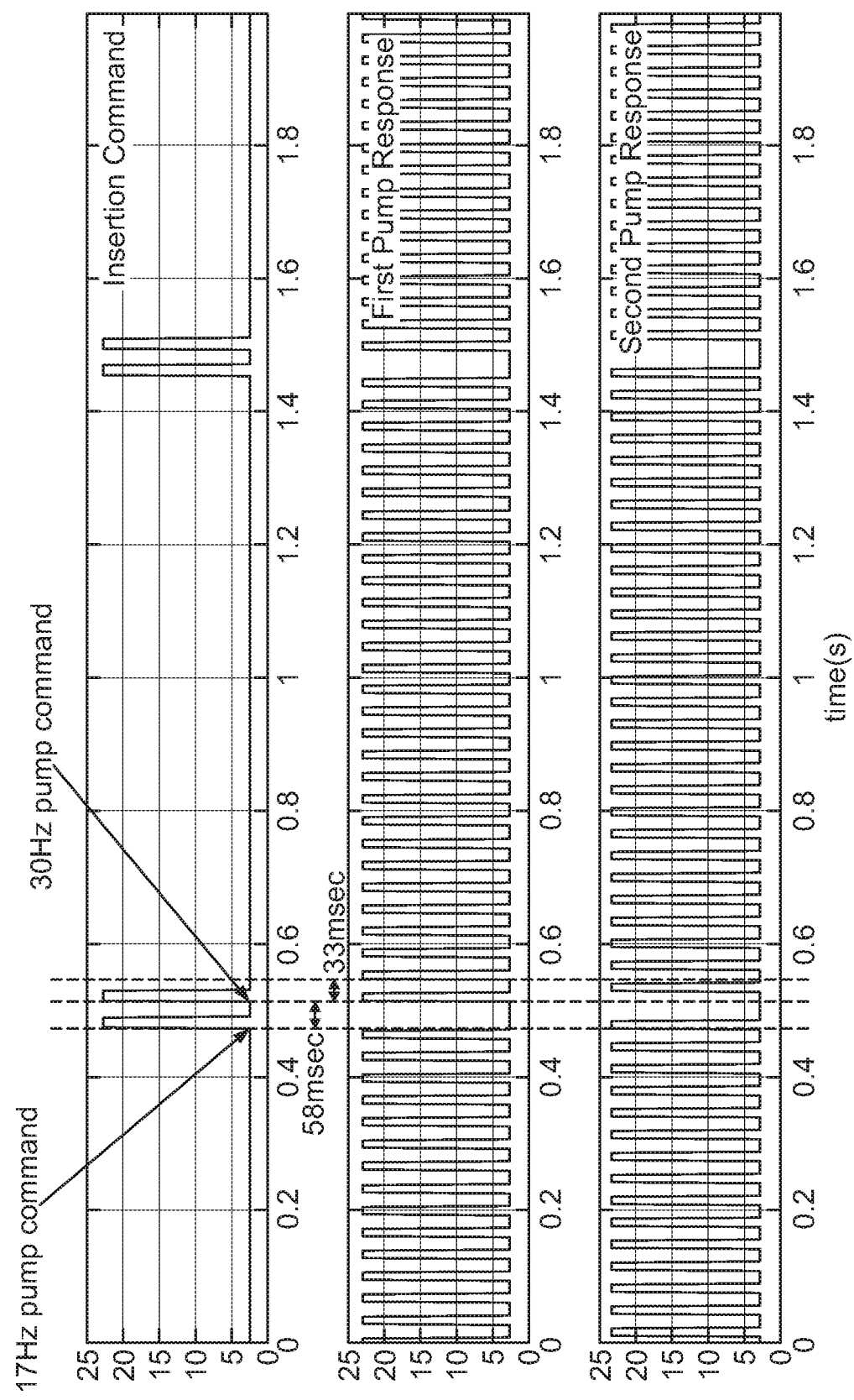
FIG. 18 are plots of insertion command versus first pump and second pump response for the sequence of insertion commands described in FIG. 17 recorded over a period of 2 minutes.

FIG. 17 are plots for controlling activation of a first pump (pump 1) and a second pump (pump 2) included in a reductant insertion assembly. FIG. 18 are plots of insertion command versus pump response for the sequence of insertion commands described in FIG. 17 recorded over a period of 2 minutes. As shown in FIG. 17, pump 1 is activated based on a first insertion command for activating pump 1 for a first duty cycle of 30 msec and insertion frequency of 17 Hz (i.e., a first insertion interval of 58 msec). The insertion interval timer starts when the first insertion command is received and is configured to run until the elapsed time period is equal to the first insertion interval, i.e., 58 msec. Pump 2 is activated for the first duty cycle when the elapsed time period corresponds to approximately 50% of the first insertion interval, i.e., 29 msec.

A second insertion command for activating pump 1 for a second duty cycle of 30 msec and insertion frequency of 30 Hz (i.e., a second insertion interval of 33 msec) is received when the elapsed time period is equal to 60 msec, while pump 1 is still inserting the reductant based on the first duty cycle. Since the second insertion interval of 33 msec is less than the time period recorded by the insertion interval timer (i.e., 60 msec), the insertion interval timer resets and restarts. Since pump 1 is still in the process of inserting the reductant for the first duty cycle, pump 1 is allowed to complete its first duty cycle. The insertion interval timer continues to run for the second insertion interval of 33 msec, but pump 2 is not activated. Once the time period recorded by insertion interval timer is equal to the second insertion interval of 33 msec, the insertion interval timer resets and restarts, and pump 1 is activated again for the second duty cycle. Pump 2 is activated when the elapsed time period after insertion interval timer restart is equal to approximately 50% of the second insertion interval, i.e., 16.5 msec. The insertion interval timer continues to run until the elapsed time period is equal to the second insertion interval of 33 msec. Pump 1 is then reactivated and the timer resets and restarts. This continues until a new insertion command is received, as shown in FIG. 18.

Figure 19:
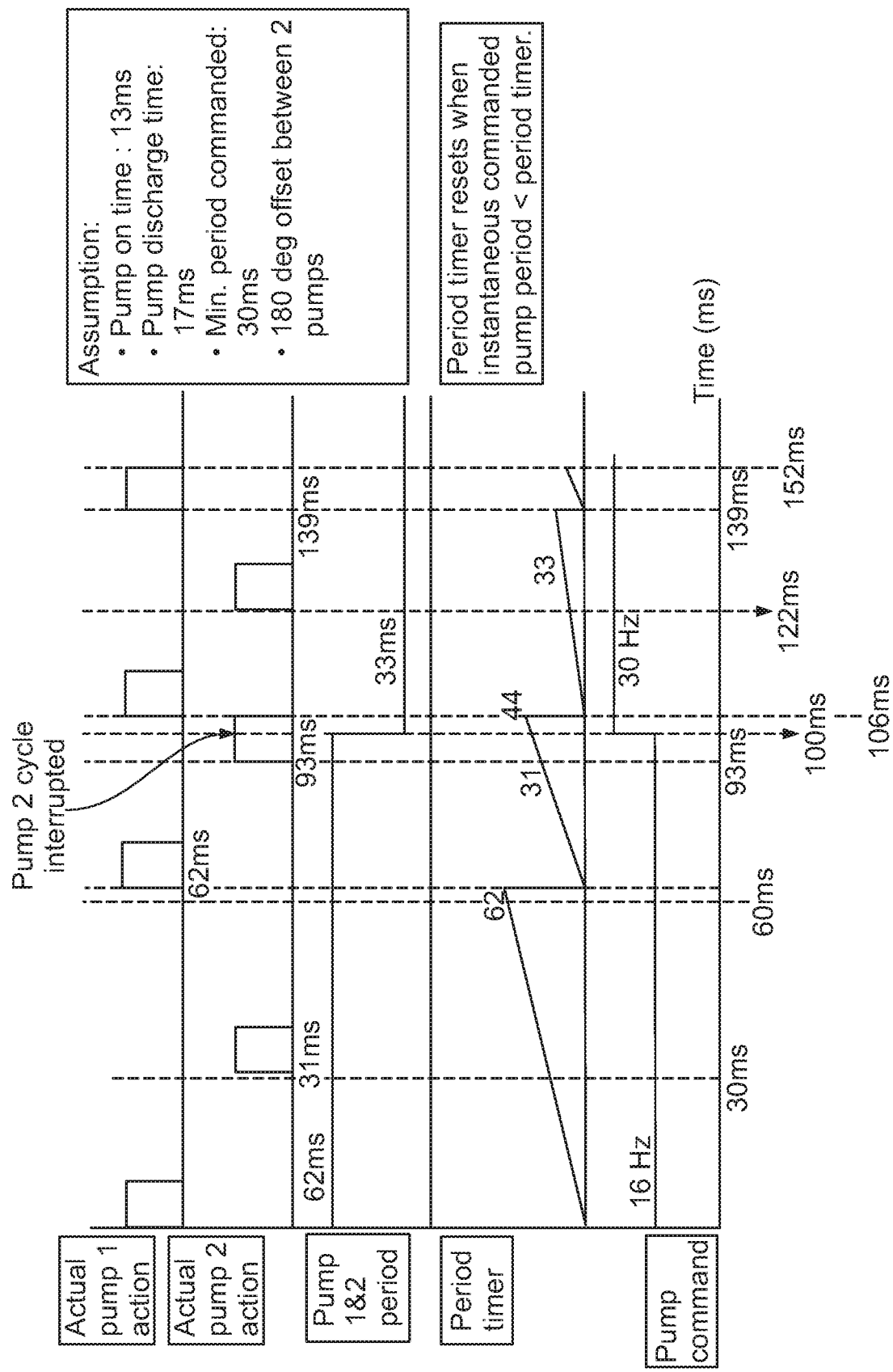
FIG. 19 are plots for controlling activation of a first pump and a second pump based on a first insertion command for activating the first and second pumps for a first duty cycle of 30 msec and insertion frequency of 16 Hz, and a second insertion command for activating the first and second pumps for a second duty cycle of 30 msec and insertion frequency of 30 Hz received after 100 msec of the first insertion command.
Figure 20:
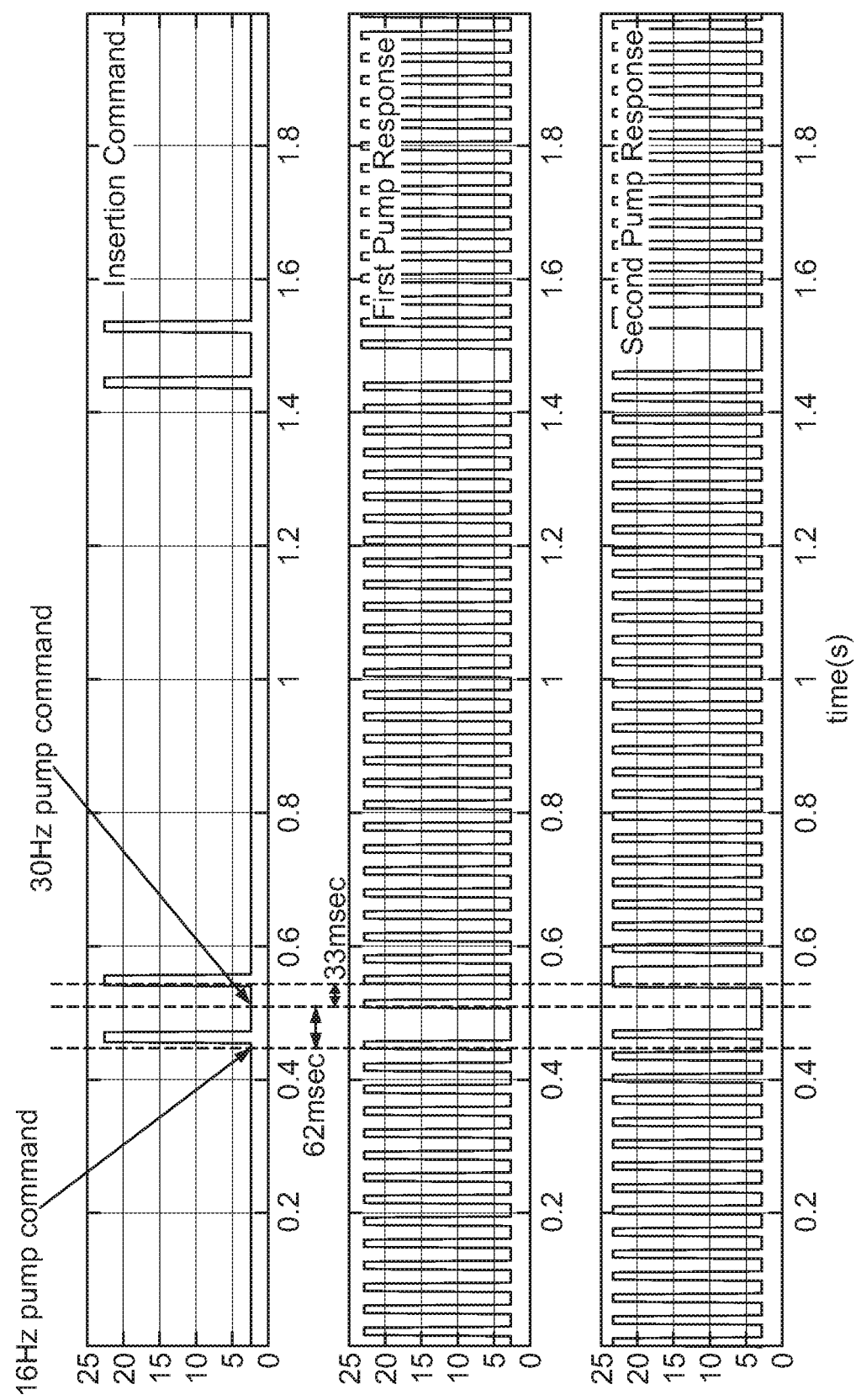
FIG. 20 are plots of insertion command versus first pump and second pump response for the sequence of insertion commands described in FIG. 19 recorded over a period of 2 minutes.

FIG. 19 are plots for controlling activation of a first pump (pump 1) and a second pump (pump 2) included in a reductant insertion assembly. FIG. 20 are plots of insertion command versus pump response for the sequence of insertion commands described in FIG. 19 recorded over a period of 2 minutes. As shown in FIG. 19, pump 1 is activated based on a first insertion command for activating pump 1 for a first duty cycle of 30 msec and insertion frequency of 16 Hz (i.e., a first insertion interval of 62.5 msec). The insertion interval timer starts when the first insertion command is received and is configured to run until the elapsed time period is equal to the first insertion interval, i.e., 62.5 msec. Pump 2 is activated for the first duty cycle when the elapsed time period corresponds to approximately 50% of the first insertion interval, i.e., 31.25 msec.

When the elapsed time period is equal to the first insertion interval of 62.5 msec, the insertion interval timer resets, pump 1 is reactivated for the first duty cycle and pump 2 is reactivated when the elapsed time period corresponds to approximately 50% of the first insertion interval of 31.25 msec (corresponding to total elapsed time of 93.75 msec).

A second insertion command for activating pump 1 for a second duty cycle of 30 msec and insertion frequency of 30 Hz (i.e., a second insertion interval of 33 msec) is received when the elapsed time period is equal to 37 msec (corresponding to a total elapsed time of 100 msec) while pump 2 is still inserting the reductant based on the first duty cycle. The second insertion interval of 33 msec is less than the time period recorded by the insertion interval timer (i.e., 37.5 msec). However, since pump 2 is still in the midst of inserting the reductant based on the first duty cycle, pump 2 is allowed to finish insertion. The insertion interval timer continues run until the pump 2 has completed its duty cycle (corresponding to total elapsed time of 106 msec). The insertion interval timer than resets and restarts so as to record a time period corresponding to the second time interval (i.e., 33 msec) and pump 1 is activated for the second duty cycle. Pump 2 is activated when the elapsed time period after insertion interval timer restart is equal to approximately 50% of the second insertion interval, i.e., 16.5 msec (corresponding to total elapsed time of 122 msec). The insertion interval timer continues to run until the elapsed time period is equal to the second insertion interval of 33 msec. Pump 1 is then reactivated and the timer resets and restarts. This continues until a new insertion command is received, as shown in FIG. 20.

Figure 21:
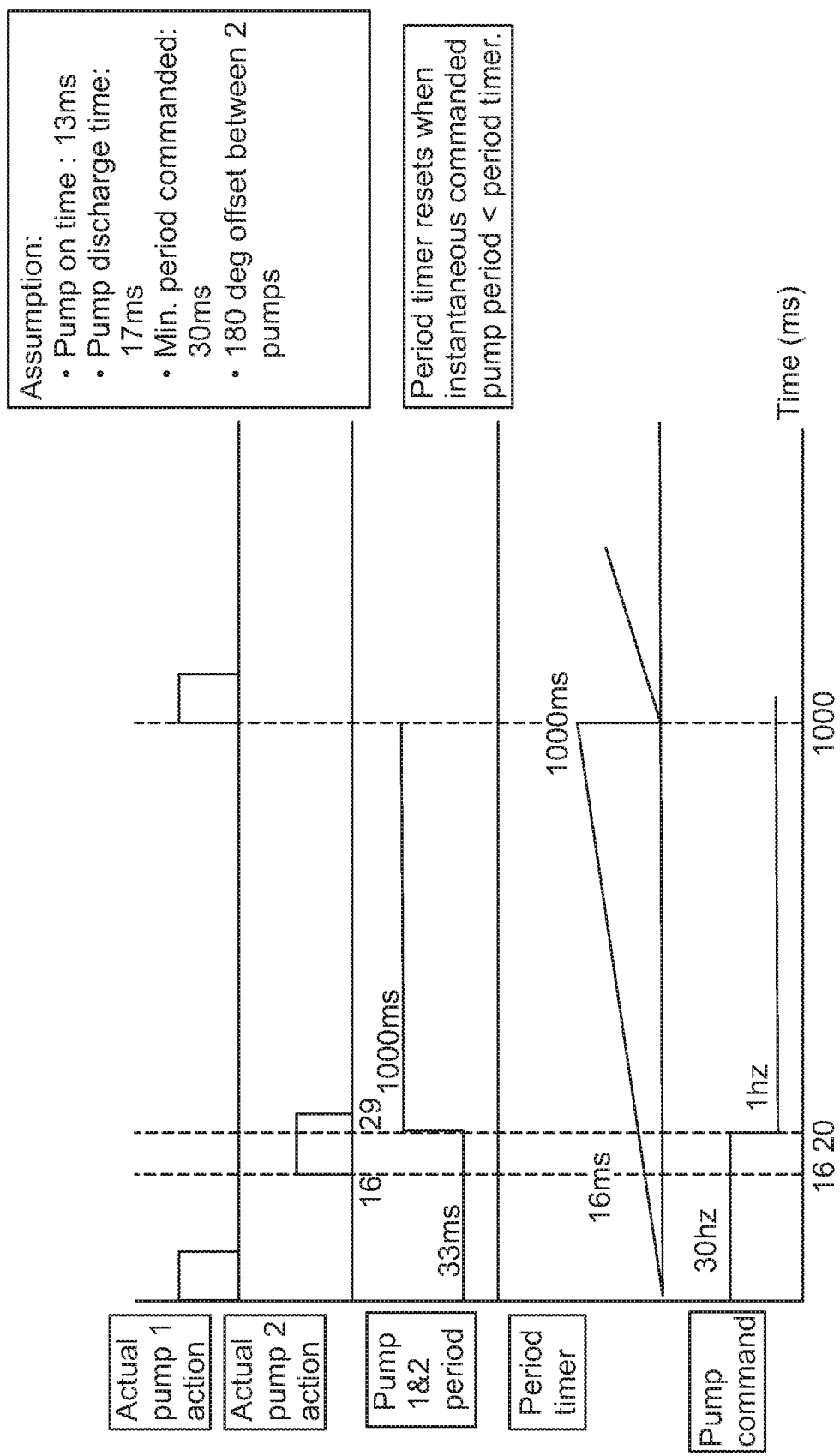
FIG. 21 are plots for controlling activation of a first pump and a second pump based on a first insertion command for activating the first and second pumps for a first duty cycle of 30 msec and insertion frequency of 30 Hz, and a second insertion command for activating the first and second pumps for a second duty cycle of 30 msec and insertion frequency of 1 Hz received after 20 msec of the first insertion command.
Figure 22:
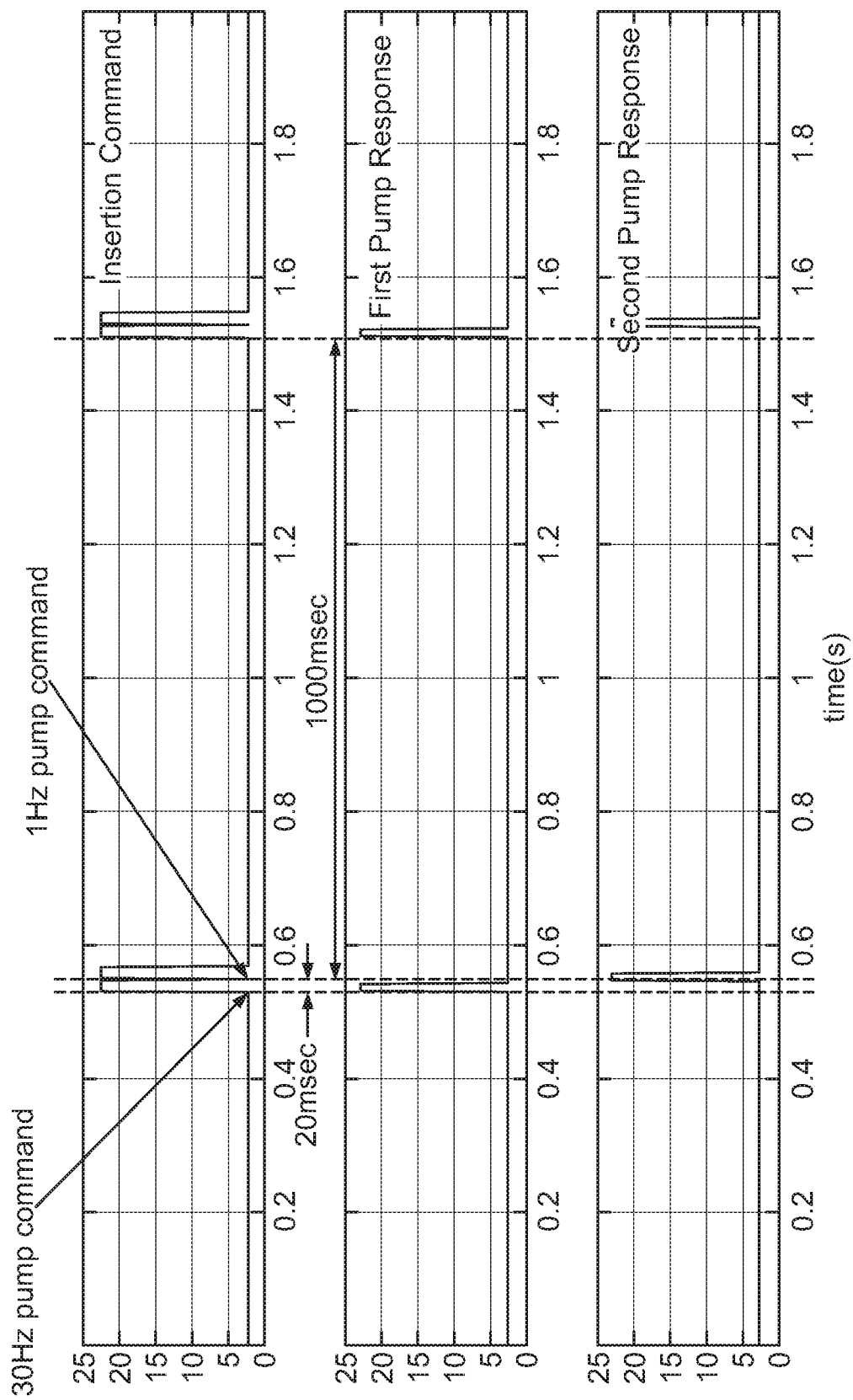
FIG. 22 are plots of insertion command versus first pump and second pump response for the sequence of insertion commands described in FIG. 19 recorded over a period of 2 minutes.

FIG. 21 are plots for controlling activation of a first pump (pump 1) and a second pump (pump 2) included in a reductant insertion assembly. FIG. 22 are plots of insertion command versus pump response for the sequence of insertion commands described in FIG. 21 recorded over a period of 2 minutes. As shown in FIG. 21, pump 1 is activated based on a first insertion command for activating pump 1 for a first duty cycle of 30 msec and insertion frequency of 30 Hz (i.e., a first insertion interval of 33 msec). The insertion interval timer starts when the first insertion command is received and is configured to run until the elapsed time period is equal to the first insertion interval, i.e., 33 msec. Pump 2 is activated for the first duty cycle when the elapsed time period is approximately 50% of the first insertion interval, i.e., 16.5 msec.

A second insertion command for activating pump 1 for a second duty cycle of 30 msec and insertion frequency of 1 Hz (i.e., a second insertion interval of 1,000 msec) is received when the elapsed time period is equal to 20 msec while pump 2 is still inserting the reductant based on the first duty cycle. The second insertion interval of 1,000 msec is greater than the time period recorded by the insertion interval timer (i.e., 20 msec). Pump 2 is allowed to finish its duty cycle, and the insertion interval timer continues to run until the elapsed time period is equal to the second insertion interval (i.e., 1,000 msec). The insertion interval timer resets and restarts, and pump 1 activated based on the second duty cycle. The insertion interval timer then continues to run for the second insertion interval, and the process is repeated until another insertion command is received, as shown in FIG. 22.

Figure 23:
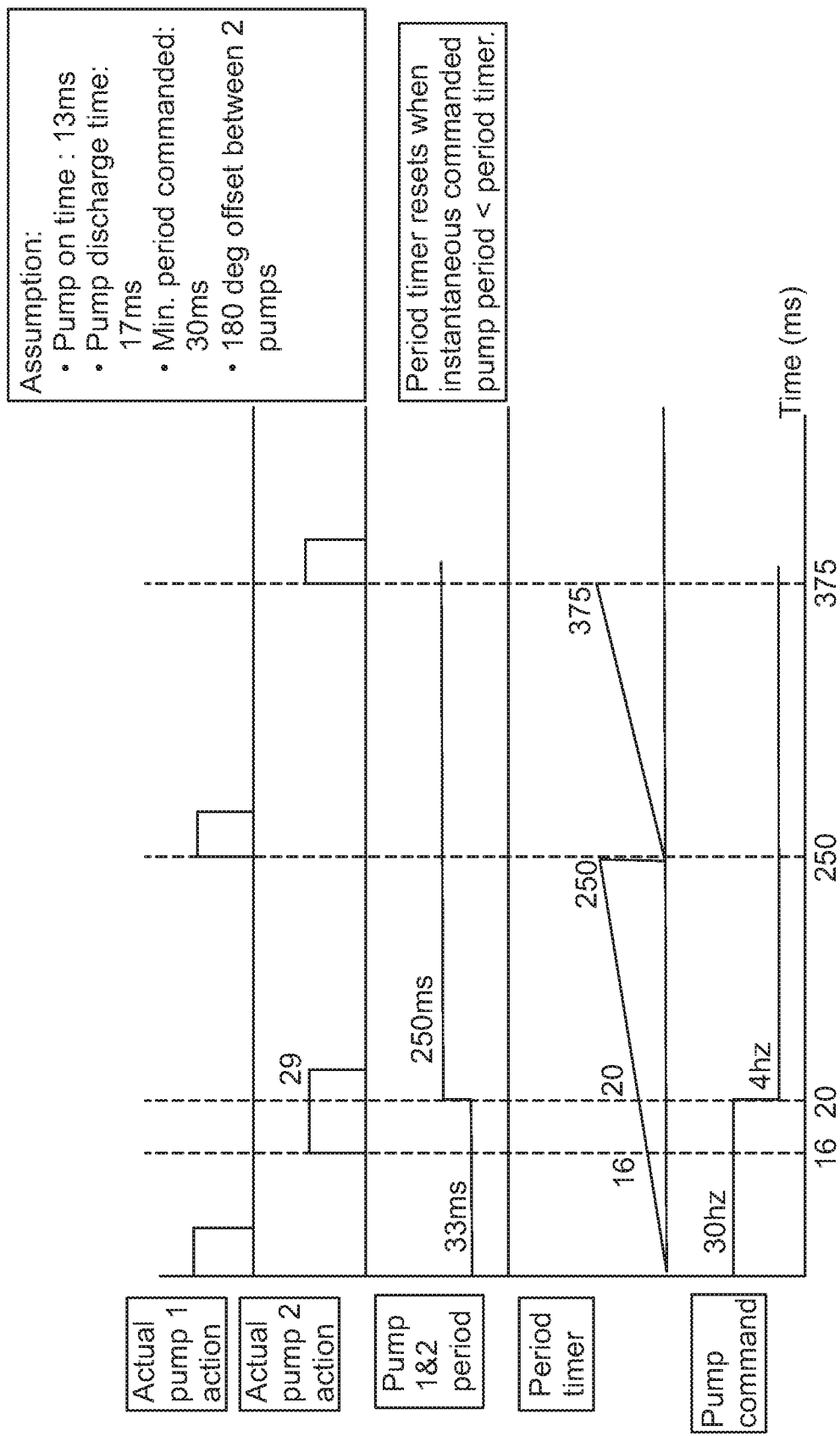
FIG. 23 are plots for controlling activation of a first pump and a second pump based on a first insertion command for activating the first and second pumps for a first duty cycle of 30 msec and insertion frequency of 30 Hz, and a second insertion command for activating the first and second pumps for a second duty cycle of 30 msec and insertion frequency of 4 Hz received after 20 msec of the first insertion command.
Figure 24:
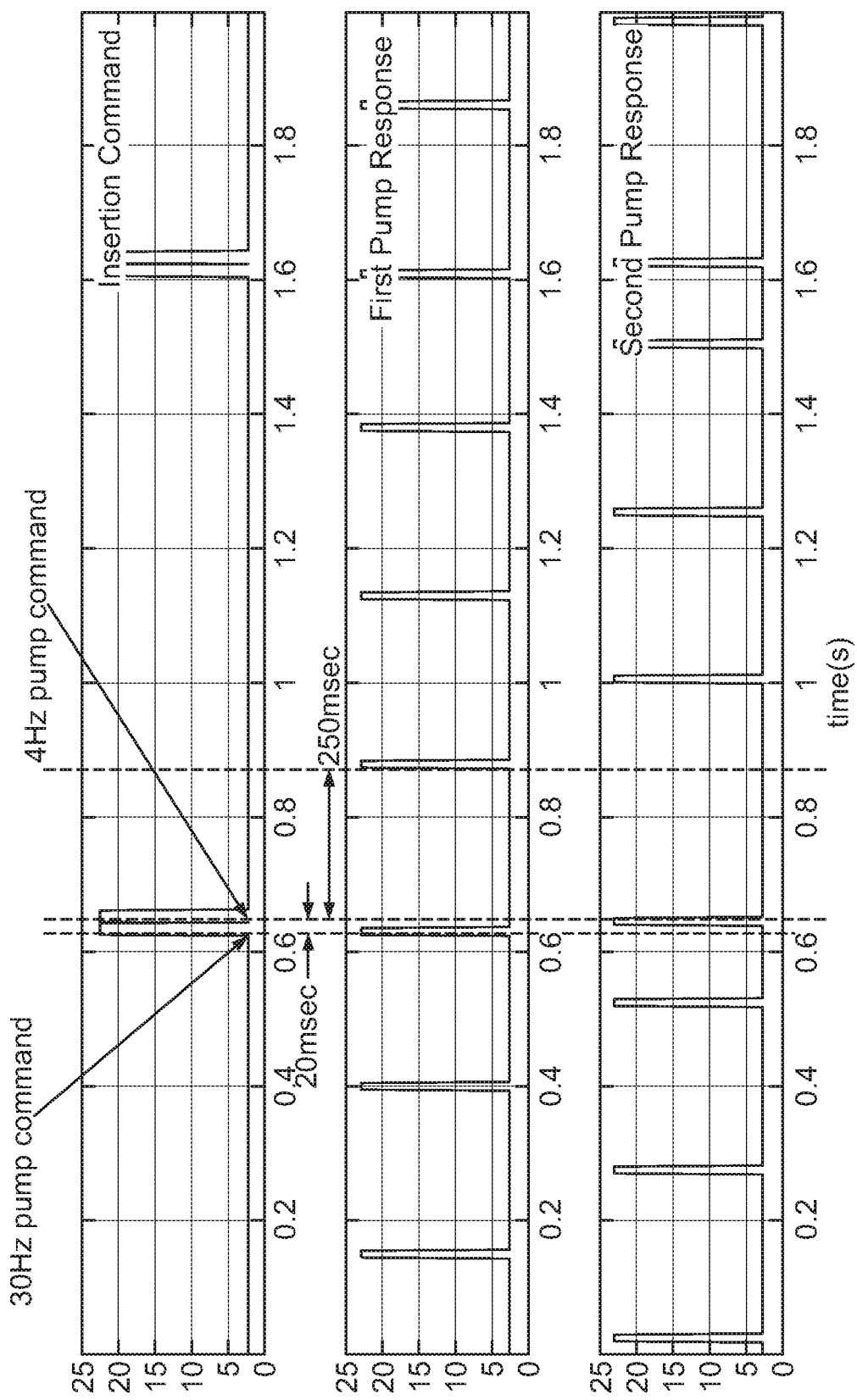
FIG. 24 are plots of insertion command versus first pump and second pump response for the sequence of insertion commands described in FIG. 19 recorded over a period of 2 minutes.

FIG. 23 are plots for controlling activation of a first pump (pump 1) and a second pump (pump 2) included in a reductant insertion assembly. FIG. 24 are plots of insertion command versus pump response for the sequence of insertion commands described in FIG. 23 recorded over a period of 2 minutes. As shown in FIG. 23, pump 1 is activated based on a first insertion command for activating pump 1 for a first duty cycle of 30 msec and insertion frequency of 30 Hz (i.e., a first insertion interval of 33 msec). The insertion interval timer starts when the first insertion command is received and is configured to run until the elapsed time period is equal to the first insertion interval, i.e., 33 msec. Pump 2 is activated for the first duty cycle when the elapsed time period corresponds to approximately 50% of the first insertion interval, i.e., 16.5 msec.

A second insertion command for activating pump 1 for a second duty cycle of 30 msec and insertion frequency of 4 Hz (i.e., a second insertion interval of 250 msec) is received after the recorded time period is equal to 20 msec, and while pump 2 is still inserting the reductant based on the first duty cycle. The second insertion interval of 250 msec is greater than the time period recorded by the insertion interval timer (i.e., 20 msec). Pump 2 is allowed to finish its duty cycle, and the insertion interval timer continues to run until the elapsed time period is equal to the second insertion interval (i.e., 250 msec). The insertion interval timer resets and restarts, and pump 1 is activated based on the second duty cycle. Pump 2 is activated when the time period recorded by the insertion interval timer is equal to approximately 50% of the second duty cycle (i.e., 125 msec corresponding to a total elapsed time of 375 msec). The insertion interval timer then continues to run for the second insertion interval, and the process is repeated until another insertion command is received, as shown in FIG. 24.

Figure 25:
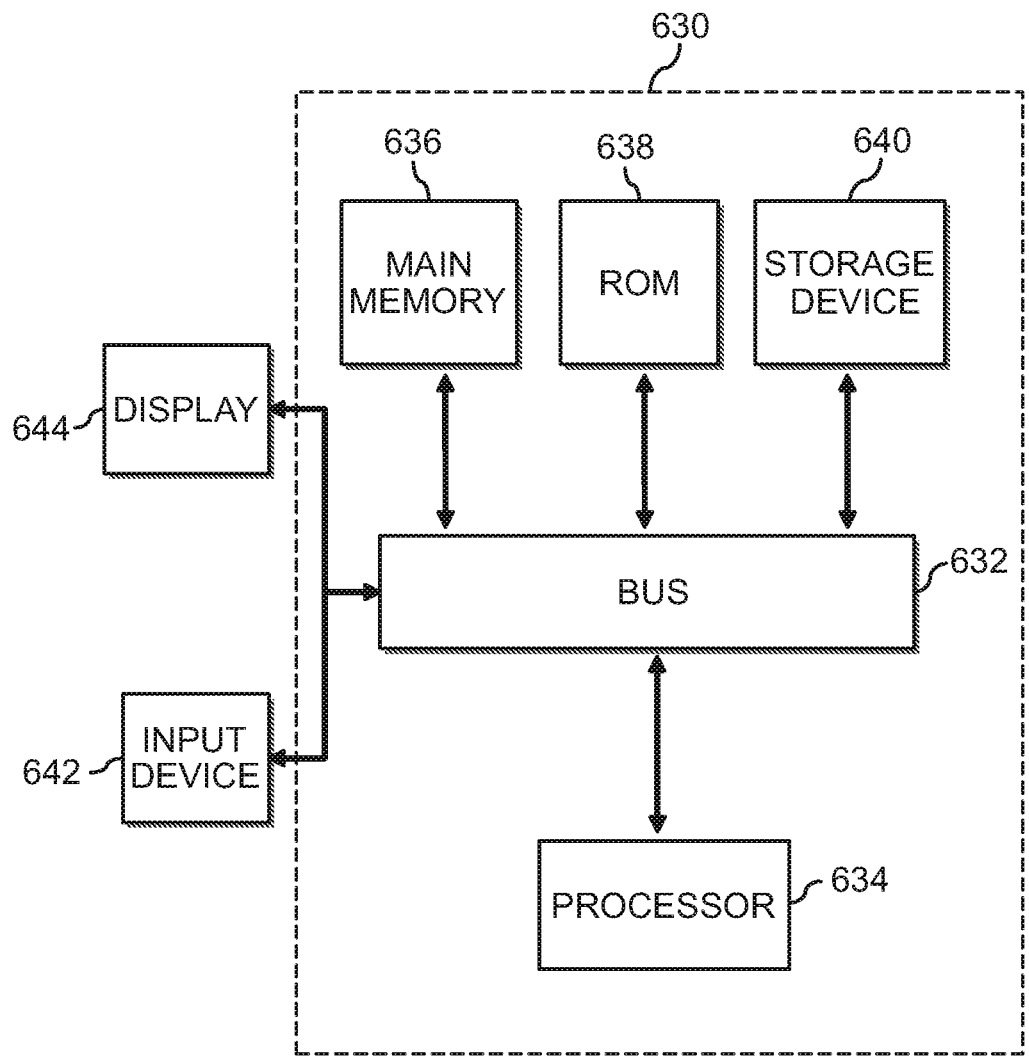
FIG. 25 is a schematic block diagram of a computing device which may be used as the controller shown in FIGS. 1 and/or 2.

In some embodiments, the controller 170, the control circuitry 171, or any of the controllers or control circuitries described herein can comprise a system computer of an apparatus or system which comprises the aftertreatment system 100 (e.g., a vehicle, an engine or generator set, etc.). For example, FIG. 25 is a block diagram of a computing device 630 in accordance with an illustrative implementation. The computing device 630 can be used to perform any of the methods or the processes described herein, for example, operations of the method 300. In some embodiments, the controller 170 can comprise the computing device 630. The computing device 630 comprises a bus 632 or other communication component for communicating information. The computing device 630 can also comprise one or more processors 634 or processing circuits coupled to the bus 632 for processing information.

The computing device 630 also comprises main memory 636, such as a random access memory (RAM) or other dynamic storage device, coupled to the bus 632 for storing information and instructions to be executed by the processor 634. Main memory 636 can also be used for storing position information, temporary variables, or other intermediate information during execution of instructions by the processor 634. The computing device 630 may further comprise ROM 638 or other static storage device coupled to the bus 632 for storing static information and instructions for the processor 634. A storage device 640, such as a solid-state device, magnetic disk or optical disk, is coupled to the bus 632 for persistently storing information and instructions. For example, instructions corresponding operations of the method 300 can be stored on the storage device 640.

The computing device 630 may be coupled via the bus 632 to a display 644, such as a liquid crystal display or active matrix display, for displaying information to a user. An input device 642, such as a keyboard or alphanumeric pad, may be coupled to the bus 632 for communicating information and command selections to the processor 634. In another implementation, the input device 642 has a touch screen display 644.

According to various implementations, the processes and methods described herein can be implemented by the computing device 630 in response to the processor 634 executing an arrangement of instructions contained in main memory 636 (e.g., the operations of the method 300). Such instructions can be read into main memory 636 from another non-transitory computer-readable medium, such as the storage device 640. Execution of the arrangement of instructions contained in main memory 636 causes the computing device 630 to perform the illustrative processes described herein. One or more processors in a multi-processing arrangement may also be employed to execute the instructions contained in main memory 636. In alternative implementations, hard-wired circuitry may be used in place of or in combination with software instructions to effect illustrative implementations. Thus, implementations are not limited to any specific combination of hardware and software.

Although an example computing device has been described in FIG. 25, implementations described in this specification can be implemented in other types of digital electronic, or in computer software, firmware, or hardware, including the structures disclosed in this specification and their structural equivalents, or in combinations of one or more of them.

Implementations described in this specification can be implemented in digital electronic, or in computer software, firmware, or hardware, including the structures disclosed in this specification and their structural equivalents, or in combinations of one or more of them. The implementations described in this specification can be implemented as one or more computer programs (i.e., one or more circuitries of computer program instructions) encoded on one or more computer storage media for execution by, or to control the operation of, data processing apparatus. A computer storage medium comprises a non-transitory computer readable medium and can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including, by way of example, a programmable processor, a computer, a system on a chip, or multiple ones, or combinations of the foregoing. The apparatus can comprise special purpose logic, e.g., an FPGA (field programmable gate array) or an ASIC (application-specific integrated circuit). In addition to hardware, the apparatus can also comprise code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuitry, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuitries, sub-programs, or portions of code). A computer program can be deployed to be executed on one computer, on multiple computers that are located at one site, or distributed across multiple sites and interconnected by a communication network.

Processors suitable for the execution of a computer program comprise, by way of example, both general and special purpose microprocessors and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also comprise, or be operatively coupled to receive data from or transfer data to, or both, one or more mass storage devices for storing data (e.g., magnetic, magneto-optical disks, or optical disks). However, a computer need not have such devices. Devices suitable for storing computer program instructions and data comprise all forms of non-volatile memory, media and memory devices, including, by way of example, semiconductor memory devices (e.g., EPROM, EEPROM, and flash memory devices); magnetic disks (e.g., internal hard disks or removable disks); magneto-optical disks; and CD-ROM and DVD-ROM disks. The processor and the memory can be supplemented by, or incorporated in, special purpose logic.

As used herein, the term "approximately" generally mean plus or minus 10% of the stated value. For example, approximately 0.5 would include 0.45 and 0.55, approximately 10 would include 9 to 11, and approximately 1000 would include 900 to 1100.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements; values of parameters, mounting arrangements; use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes, and omissions may also be made in the design, operating conditions, and arrangement of the various exemplary embodiments without departing from the scope of the present embodiments.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A controller configured to be operatively coupled to a reductant insertion assembly comprising a first pump configured to insert a reductant into a selective catalytic reduction system, the controller programmed to perform operations comprising:
   receive a first insertion command comprising information for activating the first pump for a first duty cycle, and for providing a first insertion interval between subsequent activations of the first pump;
   set an insertion interval timer for the first insertion interval, start the insertion interval timer, record an elapsed time period from the start of the insertion interval timer, and activate the first pump for the first duty cycle at the time of starting the insertion interval timer;
   receive a second insertion command comprising information for activating the first pump for a second duty cycle, and for providing a second insertion interval between subsequent activations of the first pump, the second insertion interval being different than the first insertion interval; and
   in response to determining that that the second insertion interval is smaller than the elapsed time period recorded by the insertion interval timer, set the insertion interval timer for the second insertion interval, start the insertion interval timer, and if the first pump is not already activated, activate the first pump for the second duty cycle at the time of starting the insertion interval timer.

2. The controller of claim 1, further configured to receive the second insertion command while the insertion interval timer is recording the elapsed time period from the start of the insertion interval timer.

3. The controller of claim 1, wherein the controller is further configured to:
   in response to determining that the second insertion interval is larger than the time period recorded by the insertion interval timer, continue running the insertion interval timer until the elapsed time period is equal to the second insertion interval; and
   set the insertion interval timer for the second insertion interval, start the insertion interval timer, and if the first pump is not already activated, activate the first pump for the second duty cycle at the time of starting the insertion interval timer.

4. The controller of claim 1, wherein the second duty cycle is the same as the first duty cycle.

5. The controller of claim 1, wherein the first pump is inactive during a portion of the elapsed time period after the first duty cycle is complete, until the insertion interval timer sets again.

6. The controller of claim 1, wherein the reductant insertion assembly further comprises a second pump, and wherein the controller is further configured to activate the second pump for the first duty cycle subsequent to activating the first pump, when the elapsed time period recorded by the insertion interval timer corresponds to approximately 50% of the first insertion interval.

7. The controller of claim 6, further configured to activate the second pump for the second duty cycle subsequent to activating the first pump for the second duty cycle, when the elapsed time period recorded by the insertion interval timer corresponds to approximately 50% of the second insertion interval.

8. The controller of claim 6, wherein the controller receives the second insertion command before the second pump is activated, and the second insertion interval is less than the first insertion interval, and wherein the controller is further configured to:
   activate the first pump for the second duty cycle; and
   set the insertion interval timer for the second insertion interval, start the insertion interval timer, and activate the second pump for the second duty cycle subsequent to activating the first pump, when the elapsed time period recorded by the insertion interval timer corresponds to approximately 50% of the second insertion interval.

9. The controller of claim 8, further configured to activate the first pump for the second duty cycle subsequent to activating the second pump for the second duty cycle, when the elapsed time period recorded by the insertion interval timer is equal to the second insertion interval.

10. The controller of claim 1, wherein the reductant insertion assembly further comprises a second pump and a third pump, and wherein the controller is further configured to:
   activate the second pump for the first duty cycle subsequent to activating the first pump, when the elapsed time period recorded by the insertion interval timer corresponds to approximately 33% of the first insertion interval; and
   activate the third pump for the first duty cycle subsequent to activating the second pump when the elapsed time period recorded by the insertion interval timer corresponds to approximately 66% of the first insertion interval.

11. An aftertreatment system comprising:
a selective catalytic reduction system;
a reductant insertion assembly fluidly coupled to the selective catalytic reduction system, the reductant insertion assembly comprising a first pump configured to insert a reductant into the selective catalytic reduction system; and
the controller according to claim 1 operatively coupled to the reductant insertion assembly.

12. A method for controlling operations of a reductant insertion assembly that includes a first pump for inserting reductant into a selective catalytic reduction system, the method comprising:
receiving a first insertion command comprising information for activating the first pump for a first duty cycle, and for providing a first insertion interval between subsequent activations of the first pump;
setting an insertion interval timer for the first insertion interval, starting the insertion interval timer, recording an elapsed time period from the start of the insertion interval timer, and activating the first pump for the first duty cycle at the time of starting the insertion interval timer;
receiving a second insertion command comprising information for activating the first pump for a second duty cycle, and for providing a second insertion interval between subsequent activations of the first pump, the second insertion interval being different than the first insertion interval; and
in response to determining that that the second insertion interval is smaller than the elapsed time period recorded by the insertion interval timer, setting the insertion interval timer for the second insertion interval, starting the insertion interval timer, and if the first pump is not already activated, activating the first pump for the second duty cycle at the time of starting the insertion interval timer.

13. The method of claim 12, wherein the second insertion command is received while the insertion interval timer is recording the elapsed time period from the start of the insertion interval timer.

14. The method of claim 12, further comprising:
in response to determining that the second insertion interval is larger than the time period recorded by the insertion interval timer, continuing to run the insertion interval timer until the elapsed time period is equal to the second insertion interval; and
setting the insertion interval timer for the second insertion interval, starting the insertion interval timer, and if the first pump is not already activated, activating the first pump for the second duty cycle at the time of starting the insertion interval timer.

15. The method of claim 12, wherein the second duty cycle is the same as the first duty cycle.

16. The method of claim 12, further comprising maintaining the pump in an inactive state during a portion of the elapsed time period after the first duty cycle is complete, until the insertion interval timer sets again.

17. The method of claim 12, wherein the reductant insertion assembly further comprises a second pump, and wherein the method further comprises activating the second pump for the first duty cycle subsequent to activating the first pump, when the elapsed time period recorded by the insertion interval timer corresponds to approximately 50% of the first insertion interval.

18. The method of claim 17, further comprising activating the second pump for the second duty cycle subsequent to activating the first pump for the second duty cycle, when the elapsed time period recorded by the insertion interval timer corresponds to approximately 50% of the second insertion interval.

19. The method of claim 17, wherein the second insertion command is received before the second pump is activated, and the second insertion interval is less than the first insertion interval, and wherein method further comprises:
activating the first pump for the second duty cycle, and
setting the insertion interval timer for the second insertion interval, starting the insertion interval timer, and activating the second pump for the second duty cycle subsequent to activating the first pump, when the elapsed time period recorded by the insertion interval timer corresponds to approximately 50% of the second insertion interval.

20. The method of claim 19, further comprising activating the first pump for the second duty cycle subsequent to activating the second pump for the second duty cycle, when the elapsed time period recorded by the insertion interval timer is equal to the second insertion interval.

* * * * *